(12) United States Patent
Conner et al.

(10) Patent No.: US 9,049,500 B2
(45) Date of Patent: Jun. 2, 2015

(54) FIBER OPTIC TERMINALS, SYSTEMS, AND METHODS FOR NETWORK SERVICE MANAGEMENT

(75) Inventors: Mark E. Conner, Granite Falls, NC (US); Kenneth F. Dunn, Jr., Statesville, NC (US)

(73) Assignee: Corning Cable Systems LLC, Hickory, NC (US)

( * ) Notice: Subject to any disclaimer, the term of this patent is extended or adjusted under 35 U.S.C. 154(b) by 102 days.

(21) Appl. No.: 13/601,245

(22) Filed: Aug. 31, 2012

(65) Prior Publication Data
US 2014/0064731 A1 Mar. 6, 2014

(51) Int. Cl.
*H04J 14/00* (2006.01)
*H04Q 11/00* (2006.01)
*H04B 10/2575* (2013.01)

(52) U.S. Cl.
CPC ...... *H04Q 11/0067* (2013.01); *H04B 10/25756* (2013.01)

(58) Field of Classification Search
CPC ............ H04Q 11/0067; H04Q 11/0428; H04J 14/023; H04J 14/0239; H04J 14/0242; H04J 14/0245; H04J 14/0247; H04J 14/0252; H04B 10/25753; H04B 10/25754; H04B 10/25756; H04B 10/27; H04B 10/272; H04B 10/278
USPC ............ 398/43–74, 33, 13, 20, 28, 2–7, 141, 398/142, 139, 134
See application file for complete search history.

(56) References Cited

U.S. PATENT DOCUMENTS

| | | | |
|---|---|---|---|
| 1,280,393 A | 10/1918 | Cannon | |
| 1,703,255 A | 2/1929 | Wagner | |
| 2,003,147 A | 5/1935 | Holm-Hansen | |
| 2,044,073 A | 6/1936 | Hurley | |

(Continued)

FOREIGN PATENT DOCUMENTS

| | | |
|---|---|---|
| DE | 4130706 A1 | 3/1993 |
| DE | 4133375 C1 | 4/1993 |

(Continued)

OTHER PUBLICATIONS

Mark M. Clougherty, et al., "The AnyMedia® Access System—Providing Solutions for Distribution and Network Independence," Bell Labs Technical Journal, vol. 4, Issue 2, 1999, pp. 98-127.

(Continued)

*Primary Examiner* — M. R. Sedighian

(57) ABSTRACT

Fiber optic terminals, systems, and methods for providing differentiated network services to subscribers of a fiber optic network are disclosed. In certain embodiments, fiber optic terminals and methods are disclosed for providing more than one network service to subscribers supported by the same fiber optic terminal. In one embodiment, a fiber optic terminal is provided comprising a first optical path connected to a first network-side optical fiber providing a first network service to a first subscriber-side optical fiber. The fiber optic terminal also comprises a second optical path connected to a second network-side optical fiber providing a second network service differentiated from the first network service to a second subscriber-side optical fiber. In this manner, differentiated network services can be provided to subscribers supported by the fiber optic terminal by configuring connections of the subscribers to either the first optical path or second optical path in the fiber optic terminal.

12 Claims, 7 Drawing Sheets

(56) References Cited

U.S. PATENT DOCUMENTS

| | | | |
|---|---|---|---|
| 2,131,408 | A | 9/1938 | Murrer |
| 2,428,149 | A | 9/1947 | Falk |
| 2,681,201 | A | 6/1954 | Grunwald |
| 2,984,488 | A | 5/1961 | Kirchner |
| 3,054,994 | A | 9/1962 | Haram |
| 3,204,867 | A | 9/1965 | Wahlbom |
| 3,435,124 | A | 3/1969 | Channell |
| 3,880,390 | A | 4/1975 | Niven |
| 4,006,540 | A | 2/1977 | Lemelson |
| 4,012,010 | A | 3/1977 | Friedman |
| 4,073,560 | A | 2/1978 | Anhalt et al. |
| 4,123,012 | A | 10/1978 | Hough |
| 4,177,961 | A | 12/1979 | Gruenewald |
| 4,210,380 | A | 7/1980 | Brzostek |
| D257,613 | S | 12/1980 | Gruenewald |
| 4,244,544 | A | 1/1981 | Kornat |
| 4,261,529 | A | 4/1981 | Sandberg et al. |
| 4,261,644 | A | 4/1981 | Giannaris |
| 4,480,449 | A | 11/1984 | Getz et al. |
| 4,497,457 | A | 2/1985 | Harvey |
| 4,502,754 | A | 3/1985 | Kawa |
| 4,506,698 | A | 3/1985 | Garcia et al. |
| 4,524,384 | A | 6/1985 | Lefkowitz et al. |
| D281,574 | S | 12/1985 | O'Hara, II |
| 4,579,310 | A | 4/1986 | Wells et al. |
| 4,586,675 | A | 5/1986 | Brown |
| 4,595,255 | A | 6/1986 | Bhatt et al. |
| 4,611,887 | A | 9/1986 | Glover et al. |
| 4,697,873 | A | 10/1987 | Bouvard et al. |
| 4,736,100 | A | 4/1988 | Vastagh |
| 4,747,020 | A | 5/1988 | Brickley et al. |
| 4,778,125 | A | 10/1988 | Hu |
| 4,806,814 | A | 2/1989 | Nold |
| 4,810,054 | A | 3/1989 | Shinbori et al. |
| 4,812,004 | A | 3/1989 | Biederstedt et al. |
| 4,824,193 | A | 4/1989 | Maeda et al. |
| 4,836,479 | A | 6/1989 | Adams |
| 4,844,573 | A | 7/1989 | Gillham et al. |
| 4,884,863 | A | 12/1989 | Throckmorton |
| 4,900,118 | A | 2/1990 | Yanagawa et al. |
| 4,900,123 | A | 2/1990 | Barlow et al. |
| 4,948,220 | A | 8/1990 | Violo et al. |
| 4,961,623 | A | 10/1990 | Midkiff et al. |
| 4,979,749 | A | 12/1990 | Onanian |
| 4,995,688 | A | 2/1991 | Anton et al. |
| 5,007,701 | A | 4/1991 | Roberts |
| 5,023,646 | A | 6/1991 | Ishida et al. |
| 5,048,916 | A | 9/1991 | Caron |
| 5,048,926 | A | 9/1991 | Tanimoto |
| 5,066,149 | A | 11/1991 | Wheeler et al. |
| 5,071,211 | A | 12/1991 | Debortoli et al. |
| 5,071,220 | A | 12/1991 | Ruello et al. |
| 5,073,042 | A | 12/1991 | Mulholland et al. |
| 5,074,635 | A | 12/1991 | Justice et al. |
| 5,076,688 | A | 12/1991 | Bowen et al. |
| 5,085,384 | A | 2/1992 | Kasubke |
| 5,112,014 | A | 5/1992 | Nichols |
| D327,312 | S | 6/1992 | Myojo |
| 5,121,458 | A | 6/1992 | Nilsson et al. |
| 5,142,598 | A | 8/1992 | Tabone |
| D330,368 | S | 10/1992 | Bourgeois et al. |
| 5,189,410 | A | 2/1993 | Kosugi et al. |
| 5,204,929 | A | 4/1993 | Machall et al. |
| 5,209,441 | A | 5/1993 | Satoh |
| 5,210,374 | A | 5/1993 | Channell |
| 5,214,735 | A | 5/1993 | Henneberger et al. |
| 5,218,664 | A | 6/1993 | O'Neill et al. |
| 5,231,687 | A | 7/1993 | Handley |
| 5,233,674 | A | 8/1993 | Vladic |
| 5,243,679 | A | 9/1993 | Sharrow et al. |
| 5,255,161 | A | 10/1993 | Knoll et al. |
| 5,260,957 | A | 11/1993 | Hakimi et al. |
| 5,261,020 | A | 11/1993 | de Jong et al. |
| 5,265,187 | A | 11/1993 | Morin et al. |
| 5,271,585 | A | 12/1993 | Zetena, Jr. |
| 5,274,731 | A | 12/1993 | White |
| 5,287,428 | A | 2/1994 | Shibata |
| 5,317,663 | A | 5/1994 | Beard et al. |
| 5,323,480 | A | 6/1994 | Mullaney et al. |
| 5,333,221 | A | 7/1994 | Briggs et al. |
| 5,333,222 | A | 7/1994 | Belenkiy et al. |
| 5,348,240 | A | 9/1994 | Carmo et al. |
| 5,359,688 | A | 10/1994 | Underwood |
| 5,363,465 | A | 11/1994 | Korkowski et al. |
| 5,367,598 | A | 11/1994 | Devenish, III et al. |
| 5,375,185 | A | 12/1994 | Hermsen et al. |
| 5,383,051 | A | 1/1995 | Delrosso et al. |
| 5,402,515 | A | 3/1995 | Vidacovich et al. |
| 5,408,557 | A | 4/1995 | Hsu |
| RE34,955 | E | 5/1995 | Anton et al. |
| 5,420,956 | A | 5/1995 | Grugel et al. |
| 5,420,958 | A | 5/1995 | Henson et al. |
| 5,428,705 | A | 6/1995 | Hermsen et al. |
| 5,432,875 | A | 7/1995 | Korkowski et al. |
| 5,438,641 | A | 8/1995 | Malacarne |
| 5,442,726 | A | 8/1995 | Howard et al. |
| 5,448,015 | A | 9/1995 | Jamet et al. |
| 5,460,342 | A | 10/1995 | Dore et al. |
| 5,473,115 | A | 12/1995 | Brownlie et al. |
| 5,479,553 | A | 12/1995 | Daems et al. |
| 5,479,554 | A | 12/1995 | Roberts |
| 5,490,229 | A | 2/1996 | Ghandeharizadeh et al. |
| 5,497,444 | A | 3/1996 | Wheeler |
| 5,515,472 | A | 5/1996 | Mullaney et al. |
| 5,542,015 | A | 7/1996 | Hultermans |
| 5,548,678 | A | 8/1996 | Frost et al. |
| 5,553,183 | A | 9/1996 | Bechamps |
| 5,553,186 | A | 9/1996 | Allen |
| 5,556,060 | A | 9/1996 | Bingham et al. |
| 5,559,922 | A | 9/1996 | Arnett |
| 5,570,895 | A | 11/1996 | McCue et al. |
| 5,579,425 | A | 11/1996 | Lampert et al. |
| 5,590,234 | A | 12/1996 | Pulido |
| 5,607,126 | A | 3/1997 | Cordola et al. |
| 5,613,030 | A | 3/1997 | Hoffer et al. |
| 5,617,501 | A | 4/1997 | Miller et al. |
| 5,627,925 | A | 5/1997 | Alferness et al. |
| 5,647,043 | A | 7/1997 | Anderson et al. |
| 5,649,042 | A | 7/1997 | Saito |
| 5,652,814 | A | 7/1997 | Pan et al. |
| 5,659,655 | A | 8/1997 | Pilatos |
| 5,689,605 | A | 11/1997 | Cobb et al. |
| 5,689,607 | A | 11/1997 | Vincent et al. |
| 5,692,299 | A | 12/1997 | Daems et al. |
| 5,694,511 | A | 12/1997 | Pimpinella et al. |
| 5,706,384 | A | 1/1998 | Peacock et al. |
| 5,708,751 | A | 1/1998 | Mattei |
| 5,717,810 | A | 2/1998 | Wheeler |
| 5,724,469 | A | 3/1998 | Orlando |
| 5,731,546 | A | 3/1998 | Miles et al. |
| 5,734,776 | A | 3/1998 | Puetz |
| 5,737,475 | A | 4/1998 | Regester |
| 5,751,882 | A | 5/1998 | Daems et al. |
| 5,758,004 | A | 5/1998 | Alarcon et al. |
| 5,764,843 | A | 6/1998 | Macken et al. |
| 5,774,612 | A | 6/1998 | Belenkiy et al. |
| 5,775,648 | A | 7/1998 | Metzger |
| 5,778,132 | A | 7/1998 | Csipkes et al. |
| 5,781,678 | A | 7/1998 | Sano et al. |
| 5,793,920 | A | 8/1998 | Wilkins et al. |
| 5,793,921 | A | 8/1998 | Wilkins et al. |
| 5,796,908 | A | 8/1998 | Vicory |
| 5,802,237 | A | 9/1998 | Pulido |
| 5,810,461 | A | 9/1998 | Ive et al. |
| 5,816,081 | A | 10/1998 | Johnston |
| 5,823,646 | A | 10/1998 | Arizpe et al. |
| 5,825,955 | A | 10/1998 | Ernst et al. |
| 5,825,961 | A | 10/1998 | Wilkins et al. |
| 5,832,162 | A | 11/1998 | Sarbell |
| 5,835,657 | A | 11/1998 | Suarez et al. |
| 5,835,658 | A | 11/1998 | Smith |
| 5,862,290 | A | 1/1999 | Burek et al. |
| 5,867,621 | A | 2/1999 | Luther et al. |
| 5,870,519 | A | 2/1999 | Jenkins et al. |

(56) References Cited

U.S. PATENT DOCUMENTS

| | | |
|---|---|---|
| 5,880,864 A | 3/1999 | Williams et al. ............... 359/124 |
| 5,881,200 A | 3/1999 | Burt |
| 5,883,995 A | 3/1999 | Lu |
| 5,884,003 A | 3/1999 | Cloud et al. |
| 5,892,877 A | 4/1999 | Meyerhoefer |
| 5,909,526 A | 6/1999 | Roth et al. |
| 5,930,425 A | 7/1999 | Abel et al. |
| 5,945,633 A | 8/1999 | Ott et al. |
| 5,946,440 A | 8/1999 | Puetz |
| 5,956,439 A | 9/1999 | Pimpinella |
| 5,956,444 A | 9/1999 | Duda et al. |
| 5,969,294 A | 10/1999 | Eberle et al. |
| 5,975,769 A | 11/1999 | Larson et al. |
| 5,978,540 A | 11/1999 | Bechamps et al. |
| 6,009,225 A | 12/1999 | Ray et al. |
| 6,027,252 A | 2/2000 | Erdman et al. |
| 6,044,193 A | 3/2000 | Szentesi et al. |
| 6,059,215 A | 5/2000 | Finnis |
| 6,061,492 A | 5/2000 | Strause et al. |
| 6,065,968 A | 5/2000 | Corliss |
| 6,079,881 A | 6/2000 | Roth |
| D427,897 S | 7/2000 | Johnston et al. |
| 6,118,075 A | 9/2000 | Baker et al. |
| 6,129,221 A | 10/2000 | Shaha |
| 6,149,315 A | 11/2000 | Stephenson |
| 6,151,436 A | 11/2000 | Burek et al. |
| 6,160,946 A | 12/2000 | Thompson et al. |
| D436,027 S | 1/2001 | Johnston et al. |
| 6,175,079 B1 | 1/2001 | Johnston et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,208,796 B1 | 3/2001 | Williams Vigliaturo |
| 6,215,938 B1 | 4/2001 | Reitmeier et al. |
| 6,226,111 B1 | 5/2001 | Chang et al. |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,243,526 B1 | 6/2001 | Garibay et al. |
| 6,245,998 B1 | 6/2001 | Curry et al. |
| 6,259,851 B1 | 7/2001 | Daoud |
| 6,263,136 B1 | 7/2001 | Jennings et al. |
| 6,263,141 B1 | 7/2001 | Smith |
| 6,269,212 B1 | 7/2001 | Schiattone |
| 6,275,640 B1 | 8/2001 | Hunsinger et al. |
| 6,275,641 B1 | 8/2001 | Daoud |
| 6,278,829 B1 | 8/2001 | BuAbbud et al. |
| 6,278,831 B1 | 8/2001 | Henderson et al. |
| 6,289,159 B1 | 9/2001 | Van Hees et al. |
| 6,292,614 B1 | 9/2001 | Smith et al. |
| 6,304,707 B1 | 10/2001 | Daems et al. |
| 6,307,997 B1 | 10/2001 | Walters et al. |
| 6,307,998 B2 | 10/2001 | Williams Vigliaturo |
| 6,311,007 B1 | 10/2001 | Daoud |
| RE37,489 E | 1/2002 | Anton et al. |
| 6,343,313 B1 | 1/2002 | Salesky et al. |
| 6,347,888 B1 | 2/2002 | Puetz |
| 6,351,592 B1 | 2/2002 | Ehn et al. |
| 6,353,696 B1 | 3/2002 | Gordon et al. |
| 6,353,697 B1 | 3/2002 | Daoud |
| 6,359,228 B1 | 3/2002 | Strause et al. |
| 6,363,183 B1 | 3/2002 | Koh |
| 6,363,200 B1 | 3/2002 | Thompson et al. |
| 6,370,294 B1 | 4/2002 | Pfeiffer et al. |
| 6,385,381 B1 | 5/2002 | Janus et al. |
| 6,397,166 B1 | 5/2002 | Leung et al. |
| 6,411,767 B1 | 6/2002 | Burrous et al. |
| 6,418,262 B1 | 7/2002 | Puetz et al. |
| 6,424,781 B1 | 7/2002 | Puetz et al. |
| 6,424,782 B1 | 7/2002 | Ray |
| 6,425,694 B1 | 7/2002 | Szilagyi et al. |
| 6,427,035 B1 | 7/2002 | Mahony |
| 6,431,762 B1 | 8/2002 | Taira et al. |
| 6,434,313 B1 | 8/2002 | Clapp, Jr. et al. |
| 6,434,316 B1 | 8/2002 | Grois et al. |
| 6,438,310 B1 | 8/2002 | Lance et al. |
| 6,439,780 B1 | 8/2002 | Mudd et al. |
| D463,253 S | 9/2002 | Canty |
| 6,452,925 B1 | 9/2002 | Sistanizadeh et al. |
| 6,456,772 B1 | 9/2002 | Daoud |
| 6,464,402 B1 | 10/2002 | Andrews et al. |
| D466,087 S | 11/2002 | Cuny et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,991 B2 | 11/2002 | Sher |
| 6,496,640 B1 | 12/2002 | Harvey et al. |
| 6,499,608 B1 | 12/2002 | Sterling et al. |
| D468,996 S | 1/2003 | Sarkinen et al. |
| 6,507,691 B1 | 1/2003 | Hunsinger et al. |
| 6,522,814 B2 | 2/2003 | Yoshida et al. |
| 6,532,332 B2 | 3/2003 | Solheid et al. |
| 6,535,682 B1 | 3/2003 | Puetz et al. |
| 6,539,155 B1 | 3/2003 | Broeng et al. |
| 6,539,160 B2 | 3/2003 | Battey et al. |
| 6,542,652 B1 | 4/2003 | Mahony |
| 6,542,688 B1 | 4/2003 | Battey et al. |
| 6,543,100 B1 | 4/2003 | Finley et al. |
| 6,554,485 B1 | 4/2003 | Beatty et al. |
| 6,556,738 B2 | 4/2003 | Pfeiffer et al. |
| 6,556,763 B1 | 4/2003 | Puetz et al. |
| 6,567,601 B2 | 5/2003 | Daoud et al. |
| 6,571,047 B1 | 5/2003 | Yarkosky et al. |
| 6,577,595 B1 | 6/2003 | Counterman |
| 6,577,801 B2 | 6/2003 | Broderick et al. |
| 6,579,014 B2 | 6/2003 | Melton et al. |
| 6,580,867 B2 | 6/2003 | Galaj et al. |
| 6,581,788 B1 | 6/2003 | Winig et al. |
| 6,591,051 B2 | 7/2003 | Solheid et al. |
| 6,594,434 B1 | 7/2003 | Davidson et al. |
| 6,597,670 B1 | 7/2003 | Tweedy et al. |
| 6,598,949 B2 | 7/2003 | Frazier et al. |
| 6,612,515 B1 | 9/2003 | Tinucci et al. |
| 6,614,953 B2 | 9/2003 | Strasser et al. |
| 6,614,974 B2 | 9/2003 | Elrefaie et al. |
| 6,614,980 B1 | 9/2003 | Mahony |
| 6,621,952 B1 | 9/2003 | Pi et al. |
| 6,621,975 B2 | 9/2003 | Laporte et al. |
| 6,625,374 B2 | 9/2003 | Holman et al. |
| 6,625,375 B1 | 9/2003 | Mahony |
| 6,631,237 B2 | 10/2003 | Knudsen et al. |
| 6,633,717 B1 | 10/2003 | Knight et al. |
| 6,640,028 B1 | 10/2003 | Schroll et al. |
| RE38,311 E | 11/2003 | Wheeler |
| 6,652,163 B2 | 11/2003 | Fajardo et al. |
| 6,654,536 B2 | 11/2003 | Battey et al. |
| 6,668,127 B1 | 12/2003 | Mahony |
| 6,674,952 B2 | 1/2004 | Howell et al. |
| 6,710,366 B1 | 3/2004 | Lee et al. |
| 6,711,339 B2 | 3/2004 | Puetz et al. |
| 6,715,619 B2 | 4/2004 | Kim et al. |
| 6,741,784 B1 | 5/2004 | Guan |
| D491,286 S | 6/2004 | Winig et al. |
| D491,287 S | 6/2004 | Winig et al. |
| D491,449 S | 6/2004 | Winig et al. |
| 6,748,155 B2 | 6/2004 | Kim et al. |
| 6,760,531 B1 | 7/2004 | Solheid et al. |
| 6,766,094 B2 | 7/2004 | Smith et al. |
| D495,067 S | 8/2004 | Winig et al. |
| 6,778,752 B2 | 8/2004 | Laporte et al. |
| 6,792,191 B1 | 9/2004 | Clapp, Jr. et al. |
| 6,795,633 B2 | 9/2004 | Joseph, II |
| 6,801,695 B2 | 10/2004 | Lanier et al. |
| 6,802,724 B1 | 10/2004 | Mahony |
| 6,804,447 B2 | 10/2004 | Smith et al. |
| 6,809,258 B1 | 10/2004 | Dang et al. |
| D498,005 S | 11/2004 | Winig et al. |
| 6,816,661 B1 | 11/2004 | Barnes et al. |
| 6,819,856 B2 | 11/2004 | Dagley et al. |
| 6,819,857 B2 | 11/2004 | Douglas et al. |
| 6,845,207 B2 | 1/2005 | Schray et al. |
| 6,850,685 B2 | 2/2005 | Tinucci et al. |
| 6,865,334 B2 | 3/2005 | Cooke et al. |

(56) References Cited

U.S. PATENT DOCUMENTS

| | | |
|---|---|---|
| 6,870,734 B2 | 3/2005 | Mertesdorf et al. |
| 6,870,997 B2 | 3/2005 | Cooke et al. |
| 6,879,545 B2 | 4/2005 | Cooke et al. |
| 6,880,982 B2 | 4/2005 | Imamura |
| 6,885,798 B2 | 4/2005 | Zimmel |
| 6,915,058 B2 | 7/2005 | Pons |
| 6,915,059 B2 | 7/2005 | Daoud et al. |
| 6,920,273 B2 | 7/2005 | Knudsen |
| 6,920,274 B2 | 7/2005 | Rapp et al. |
| 6,925,241 B2 | 8/2005 | Bohle et al. |
| 6,925,852 B2 | 8/2005 | Susko |
| 6,932,514 B2 | 8/2005 | Anderson et al. |
| 6,934,451 B2 | 8/2005 | Cooke et al. |
| 6,937,807 B2 | 8/2005 | Franklin et al. |
| 6,946,605 B2 | 9/2005 | Levesque et al. |
| 6,968,107 B2 | 11/2005 | Belardi et al. |
| 6,983,095 B2 | 1/2006 | Reagan et al. |
| 6,986,608 B2 | 1/2006 | Choudhury et al. |
| 6,993,228 B2 | 1/2006 | Burke, Jr. et al. |
| 7,006,748 B2 | 2/2006 | Dagley et al. |
| 7,027,695 B2 | 4/2006 | Cooke et al. |
| 7,054,513 B2 | 5/2006 | Herz et al. |
| 7,068,907 B2 | 6/2006 | Schray |
| 7,083,051 B2 | 8/2006 | Smith et al. |
| 7,088,891 B2 | 8/2006 | Jung et al. |
| 7,110,654 B2 | 9/2006 | Dillat |
| 7,120,347 B2 | 10/2006 | Blackwell, Jr. et al. |
| 7,128,470 B2 | 10/2006 | Scherer et al. |
| 7,130,519 B2 | 10/2006 | Grubish et al. |
| 7,142,763 B2 | 11/2006 | Frohlich et al. |
| 7,142,764 B2 | 11/2006 | Allen et al. |
| 7,155,106 B2 | 12/2006 | Cianciotto et al. |
| 7,171,121 B1 | 1/2007 | Skarica et al. |
| 7,181,142 B1 | 2/2007 | Xu et al. |
| 7,200,316 B2 | 4/2007 | Giraud et al. |
| 7,200,317 B2 | 4/2007 | Reagan et al. |
| 7,201,595 B1 | 4/2007 | Morello |
| 7,215,865 B2 | 5/2007 | Bellekens et al. |
| 7,218,828 B2 | 5/2007 | Feustel et al. |
| 7,245,811 B2 | 7/2007 | Takeda et al. |
| 7,260,302 B2 | 8/2007 | Caveney |
| 7,264,402 B2 | 9/2007 | Theuerkorn et al. |
| 7,266,283 B2 | 9/2007 | Kline et al. |
| 7,272,291 B2 | 9/2007 | Bayazit et al. |
| 7,274,852 B1 | 9/2007 | Smrha et al. |
| 7,280,733 B2 | 10/2007 | Larson et al. |
| 7,289,731 B2 | 10/2007 | Thinguldstad |
| 7,298,951 B2 | 11/2007 | Smrha et al. |
| 7,302,153 B2 | 11/2007 | Thom |
| 7,310,471 B2 | 12/2007 | Bayazit et al. |
| 7,330,629 B2 | 2/2008 | Cooke et al. |
| 7,331,722 B2 | 2/2008 | Tan |
| 7,349,616 B1 | 3/2008 | Castonguay et al. |
| 7,369,741 B2 | 5/2008 | Reagan et al. |
| 7,376,325 B1 | 5/2008 | Cloud et al. |
| 7,379,650 B2 | 5/2008 | Weinert et al. |
| 7,406,241 B1 | 7/2008 | Opaluch et al. |
| 7,412,145 B2 | 8/2008 | Honma et al. |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,450,806 B2 | 11/2008 | Bookbinder et al. |
| 7,460,757 B2 | 12/2008 | Hoehne et al. |
| 7,471,867 B2 | 12/2008 | Vogel et al. |
| 7,477,826 B2 | 1/2009 | Mullaney et al. |
| 7,496,269 B1 | 2/2009 | Lee |
| 7,509,016 B2 | 3/2009 | Smith et al. |
| 7,522,805 B2 | 4/2009 | Smith et al. |
| 7,526,174 B2 | 4/2009 | Leon et al. |
| 7,609,967 B2 | 10/2009 | Hochbaum et al. |
| 7,613,376 B2 | 11/2009 | Wright et al. |
| 7,623,749 B2 | 11/2009 | Reagan et al. |
| 7,636,507 B2 | 12/2009 | Lu et al. |
| 7,664,361 B2 | 2/2010 | Trebesch et al. |
| 7,690,848 B2 | 4/2010 | Faika et al. |
| 7,766,732 B2 | 8/2010 | Hauville |
| 7,769,265 B2 | 8/2010 | Cairns |
| 7,822,310 B2 | 10/2010 | Castonguay et al. |
| 7,844,161 B2 | 11/2010 | Reagan et al. |
| 7,889,961 B2 | 2/2011 | Cote et al. |
| 7,970,249 B2 | 6/2011 | Solheid et al. |
| 7,974,509 B2 | 7/2011 | Smith et al. |
| 8,086,085 B2 | 12/2011 | Lu et al. |
| 8,265,447 B2 | 9/2012 | Loeffelholz et al. |
| 8,351,754 B2 | 1/2013 | Bell |
| 8,380,036 B2 | 2/2013 | Smith |
| 8,437,595 B2 | 5/2013 | Womack et al. |
| 8,465,317 B2 | 6/2013 | Gniadek et al. |
| 8,467,651 B2 | 6/2013 | Cao et al. |
| 8,660,397 B2 | 2/2014 | Giraud et al. |
| 8,712,206 B2 | 4/2014 | Cooke et al. |
| 2001/0001270 A1 | 5/2001 | Williams Vigliaturo |
| 2001/0036351 A1 | 11/2001 | Fritz |
| 2002/0034290 A1 | 3/2002 | Pershan |
| 2002/0037136 A1 | 3/2002 | Wang et al. |
| 2002/0051616 A1 | 5/2002 | Battey et al. |
| 2002/0118929 A1 | 8/2002 | Brun et al. |
| 2002/0148846 A1 | 10/2002 | Luburic |
| 2002/0150372 A1 | 10/2002 | Schray |
| 2002/0180163 A1 | 12/2002 | Muller et al. |
| 2002/0181896 A1 | 12/2002 | McClellan et al. |
| 2002/0181905 A1 | 12/2002 | Yoshida et al. |
| 2003/0031419 A1 | 2/2003 | Simmons et al. |
| 2003/0063866 A1 | 4/2003 | Melton et al. |
| 2003/0063875 A1 | 4/2003 | Bickham et al. |
| 2003/0095774 A1 | 5/2003 | Bohme et al. |
| 2003/0103750 A1 | 6/2003 | Laporte et al. |
| 2003/0132685 A1 | 7/2003 | Sucharczuk et al. |
| 2003/0134541 A1 | 7/2003 | Johnsen et al. |
| 2003/0142946 A1 | 7/2003 | Saito et al. |
| 2003/0147597 A1 | 8/2003 | Duran |
| 2003/0174996 A1 | 9/2003 | Henschel et al. |
| 2003/0185535 A1 | 10/2003 | Tinucci et al. |
| 2003/0194187 A1 | 10/2003 | Simmons et al. |
| 2003/0223725 A1 | 12/2003 | Laporte et al. |
| 2004/0001686 A1 | 1/2004 | Smith et al. |
| 2004/0013390 A1 | 1/2004 | Kim et al. |
| 2004/0042710 A1 | 3/2004 | Margalit et al. |
| 2004/0074852 A1 | 4/2004 | Knudsen et al. |
| 2004/0081404 A1 | 4/2004 | Elliott |
| 2004/0084465 A1 | 5/2004 | Luburic |
| 2004/0109660 A1 | 6/2004 | Liberty |
| 2004/0123998 A1 | 7/2004 | Berglund et al. |
| 2004/0141692 A1 | 7/2004 | Anderson et al. |
| 2004/0146266 A1 | 7/2004 | Solheid et al. |
| 2004/0150267 A1 | 8/2004 | Ferguson |
| 2004/0175090 A1 | 9/2004 | Vastmans et al. |
| 2004/0218970 A1 | 11/2004 | Caveney et al. |
| 2004/0228598 A1 | 11/2004 | Allen et al. |
| 2004/0240825 A1 | 12/2004 | Daoud et al. |
| 2004/0264873 A1 | 12/2004 | Smith et al. |
| 2005/0002633 A1 | 1/2005 | Solheid et al. |
| 2005/0036749 A1 | 2/2005 | Vogel et al. |
| 2005/0100301 A1 | 5/2005 | Solheid et al. |
| 2005/0123261 A1 | 6/2005 | Bellekens et al. |
| 2005/0129379 A1 | 6/2005 | Reagan et al. |
| 2005/0135753 A1 | 6/2005 | Eigenmann et al. |
| 2005/0152306 A1 | 7/2005 | Bonnassieux et al. |
| 2005/0213921 A1 | 9/2005 | Mertesdorf et al. |
| 2005/0232565 A1 | 10/2005 | Heggestad et al. |
| 2005/0238290 A1 | 10/2005 | Choudhury et al. |
| 2005/0265683 A1 | 12/2005 | Cianciotto et al. |
| 2005/0276562 A1 | 12/2005 | Battey et al. |
| 2005/0281526 A1 | 12/2005 | Vongseng et al. |
| 2006/0029334 A1 | 2/2006 | Quinby et al. |
| 2006/0049941 A1 | 3/2006 | Hunter et al. |
| 2006/0072892 A1 | 4/2006 | Serrander et al. |
| 2006/0083461 A1 | 4/2006 | Takahashi et al. |
| 2006/0083468 A1 | 4/2006 | Kahle et al. |
| 2006/0093278 A1 | 5/2006 | Elkins, II et al. |
| 2006/0093301 A1 | 5/2006 | Zimmel et al. |
| 2006/0093303 A1 | 5/2006 | Reagan et al. |
| 2006/0098931 A1 | 5/2006 | Sibley et al. |
| 2006/0127087 A1* | 6/2006 | Kasai et al. .......... 398/45 |

(56) References Cited

U.S. PATENT DOCUMENTS

| | | |
|---|---|---|
| 2006/0133753 A1 | 6/2006 | Nelson et al. |
| 2006/0153515 A1 | 7/2006 | Honma et al. |
| 2006/0153516 A1 | 7/2006 | Napiorkowski et al. |
| 2006/0153517 A1 | 7/2006 | Reagan et al. |
| 2006/0165364 A1 | 7/2006 | Frohlich et al. |
| 2006/0182407 A1 | 8/2006 | Caveney |
| 2006/0193590 A1 | 8/2006 | Puetz et al. |
| 2006/0210229 A1 | 9/2006 | Scadden |
| 2006/0210230 A1 | 9/2006 | Kline et al. |
| 2006/0215980 A1 | 9/2006 | Bayazit et al. |
| 2006/0251373 A1 | 11/2006 | Hodge et al. |
| 2006/0263029 A1 | 11/2006 | Mudd et al. |
| 2006/0269205 A1 | 11/2006 | Zimmel |
| 2006/0269206 A1 | 11/2006 | Zimmel |
| 2006/0269208 A1 | 11/2006 | Allen et al. |
| 2006/0275007 A1 | 12/2006 | Livingston et al. |
| 2006/0275008 A1 | 12/2006 | Xin |
| 2006/0279423 A1 | 12/2006 | Nazari |
| 2006/0285807 A1 | 12/2006 | Lu et al. |
| 2007/0003204 A1 | 1/2007 | Makrides-Saravanos et al. |
| 2007/0003205 A1 | 1/2007 | Saravanos et al. |
| 2007/0023464 A1 | 2/2007 | Barkdoll et al. |
| 2007/0031099 A1 | 2/2007 | Herzog et al. |
| 2007/0031101 A1 | 2/2007 | Kline et al. |
| 2007/0047891 A1 | 3/2007 | Bayazit et al. |
| 2007/0047893 A1 | 3/2007 | Kramer et al. |
| 2007/0047894 A1 | 3/2007 | Holmberg et al. |
| 2007/0052531 A1 | 3/2007 | Mathews et al. |
| 2007/0104447 A1 | 5/2007 | Allen |
| 2007/0114339 A1 | 5/2007 | Winchester |
| 2007/0183732 A1 | 8/2007 | Wittmeier et al. |
| 2007/0263962 A1 | 11/2007 | Kohda |
| 2007/0274718 A1 | 11/2007 | Bridges et al. |
| 2008/0008437 A1 | 1/2008 | Reagan et al. |
| 2008/0063350 A1 | 3/2008 | Trebesch et al. |
| 2008/0085094 A1 | 4/2008 | Krampotich |
| 2008/0131067 A1 | 6/2008 | Ugolini et al. |
| 2008/0138026 A1 | 6/2008 | Yow et al. |
| 2008/0145008 A1 | 6/2008 | Lewallen et al. |
| 2008/0193091 A1 | 8/2008 | Herbst |
| 2008/0205844 A1 | 8/2008 | Castonguay et al. |
| 2008/0253723 A1 | 10/2008 | Stokes et al. |
| 2008/0259928 A1 | 10/2008 | Chen et al. |
| 2008/0292261 A1 | 11/2008 | Kowalczyk et al. |
| 2008/0317425 A1 | 12/2008 | Smith et al. |
| 2009/0022470 A1 | 1/2009 | Krampotich |
| 2009/0034929 A1 | 2/2009 | Reinhardt et al. |
| 2009/0060440 A1 | 3/2009 | Wright et al. |
| 2009/0074371 A1 | 3/2009 | Bayazit et al. |
| 2009/0097813 A1 | 4/2009 | Hill |
| 2009/0103865 A1 | 4/2009 | Del Rosso |
| 2009/0103878 A1 | 4/2009 | Zimmel |
| 2009/0148118 A1 | 6/2009 | Gronvall et al. |
| 2009/0208210 A1 | 8/2009 | Trojer et al. |
| 2009/0245743 A1 | 10/2009 | Cote et al. |
| 2009/0245746 A1 | 10/2009 | Krampotich et al. |
| 2009/0252462 A1 | 10/2009 | Bonical |
| 2009/0263122 A1 | 10/2009 | Helkey et al. |
| 2009/0274429 A1 | 11/2009 | Krampotich et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0061693 A1 | 3/2010 | Bran De Leon et al. |
| 2010/0183274 A1 | 7/2010 | Brunet et al. |
| 2010/0290753 A1 | 11/2010 | Tang et al. |
| 2011/0052133 A1 | 3/2011 | Simmons et al. |
| 2011/0097052 A1 | 4/2011 | Solheid et al. |
| 2011/0158599 A1 | 6/2011 | Kowalczyk et al. |
| 2012/0104145 A1 | 5/2012 | Dagley et al. |
| 2012/0301096 A1 | 11/2012 | Badar et al. |
| 2012/0308190 A1 | 12/2012 | Smith et al. |
| 2013/0034333 A1 | 2/2013 | Holmberg et al. |
| 2014/0119705 A1 | 5/2014 | Fabrykowski et al. |

FOREIGN PATENT DOCUMENTS

| | | | |
|---|---|---|---|
| DE | 4240727 C1 | 2/1994 | |
| DE | 29800194 U1 | 3/1998 | |
| DE | 10005294 A1 | 8/2001 | |
| DE | 10238189 A1 | 2/2004 | |
| DE | 202004011493 U1 | 9/2004 | |
| DE | 20320702 U1 | 10/2005 | |
| DE | 202005018884 U1 | 2/2006 | |
| DE | 202007000556 U1 | 10/2007 | |
| DE | 202007012420 U1 | 10/2007 | |
| DE | 202010009385 U1 | 9/2010 | |
| EP | 0409390 A2 | 1/1991 | |
| EP | 0410622 A2 | 1/1991 | |
| EP | 0415647 A2 | 3/1991 | |
| EP | 0490644 A1 | 6/1992 | |
| EP | 0541820 A1 | 5/1993 | |
| EP | 0593927 A1 | 4/1994 | |
| EP | 0720322 A2 | 7/1996 | |
| EP | 0725468 A1 | 8/1996 | |
| EP | 0828356 A2 | 3/1998 | |
| EP | 0840153 A2 | 5/1998 | |
| EP | 0928053 A2 | 7/1999 | |
| EP | 1107031 A1 | 6/2001 | |
| EP | 1120674 A1 | 8/2001 | |
| EP | 1179745 A2 | 2/2002 | |
| EP | 1203974 A2 | 5/2002 | |
| EP | 1316829 A2 | 6/2003 | |
| EP | 1944635 A2 | 7/2008 | |
| EP | 1944886 A1 | 7/2008 | |
| EP | 2060942 A2 | 5/2009 | |
| EP | 2141527 A2 | 1/2010 | |
| FR | 2123728 A5 | 9/1972 | |
| FR | 2748576 A1 | 11/1997 | |
| GB | 2254163 A | 9/1992 | |
| JP | 59107317 A | 6/1984 | |
| JP | 6227312 A | 8/1994 | |
| JP | 11125722 A | 5/1999 | |
| JP | 11231163 A | 8/1999 | |
| JP | 2001116968 A | 4/2001 | |
| JP | 2004061713 A | 2/2004 | |
| WO | 8805925 A1 | 8/1988 | |
| WO | 8905989 A1 | 6/1989 | |
| WO | 9507484 A1 | 3/1995 | |
| WO | 9630791 A1 | 10/1996 | |
| WO | 9638752 A1 | 12/1996 | |
| WO | 9722025 A1 | 6/1997 | |
| WO | 9725642 A1 | 7/1997 | |
| WO | 9736197 A1 | 10/1997 | |
| WO | 0221186 A1 | 3/2002 | |
| WO | 02099528 A1 | 12/2002 | |
| WO | 03009527 A2 | 1/2003 | |
| WO | WO03/009527 A2 | 1/2003 | ............. H04L 12/00 |
| WO | 03093889 A1 | 11/2003 | |
| WO | 2004086112 A1 | 10/2004 | |
| WO | 2005020400 A1 | 3/2005 | |
| WO | 2005050277 A2 | 6/2005 | |
| WO | 2005088373 A1 | 9/2005 | |
| WO | 2005091036 A1 | 9/2005 | |
| WO | 2006050505 A1 | 5/2006 | |
| WO | 2006127457 A1 | 11/2006 | |
| WO | 2006135524 A3 | 12/2006 | |
| WO | 2007050515 A1 | 5/2007 | |
| WO | 2007089682 A2 | 8/2007 | |
| WO | 2007129953 A1 | 11/2007 | |
| WO | 2008033997 A1 | 3/2008 | |
| WO | 2008048935 A2 | 4/2008 | |
| WO | 2008125217 A1 | 10/2008 | |
| WO | 2008137894 A1 | 11/2008 | |
| WO | 2009029485 A1 | 3/2009 | |

OTHER PUBLICATIONS

Kikuchi, et al., "Optical wavelength-division multiplexing high-speed switching system for B-ISDN," Proceedings of the Global Telecommunications Conference, New York, IEEE, Dec. 1991, 5 pages.

Patent Cooperation Treaty, International Search Report for International Application No. PCT/US2009/066779, Aug. 27, 2010, 2 pages.

(56) References Cited

OTHER PUBLICATIONS

Non-final Office Action for U.S. Appl. No. 12/417,250 mailed Jun. 23, 2011, 9 pages.
Final Office Action for U.S. Appl. No. 12/417,250 mailed Mar. 3, 2011, 9 pages.
Non-final Office Action for U.S. Appl. No. 12/417,250 mailed Jul. 27, 2010, 11 pages.
Advisory Action for U.S. Appl. No. 12/697,628 mailed Mar. 1, 2012, 3 pages.
Final Office Action for U.S. Appl. No. 12/697,628 mailed Nov. 17, 2011, 15 pages.
Non-final Office Action for U.S. Appl. No. 12/697,628 mailed Apr. 6, 2011, 11 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Quayle Action for U.S. Appl. No. 12/861,345 mailed Apr. 9, 2012, 6 pages.
Non-final Office Action for U.S. Appl. No. 12/861,345 mailed Dec. 15, 2011, 10 pages.
Non-final Office Action for U.S. Appl. No. 12/700,837 mailed Jan. 30, 2012, 7 pages.
Final Office Action for U.S. Appl. No. 12/474,866 mailed Jan. 31, 2012, 8 pages.
Non-final Office Action for U.S. Appl. No. 12/474,866 mailed Aug. 5, 2011, 9 pages.
International Search Report for PCT/US2009/066779, Aug. 27, 2010, 3 pages.
International Search Report for PCT/EP2009/000929, Apr. 27, 2009, 4 pages.
Final Office Action for U.S. Appl. No. 12/700,837 mailed Aug. 31, 2012, 10 pages.
International Search Report for PCT/US2007/023631, mailed Apr. 21, 2008, 2 pages.
International Search Report for PCT/US2008/000095 mailed Sep. 12, 2008, 5 pages.
International Search Report for PCT/US2008/002514 mailed Aug. 8, 2008, 2 pages.
International Search Report for PCT/US2008/006798 mailed Oct. 1, 2008, 2 pages.
Advisory Action for U.S. Appl. No. 12/072,187 mailed Aug. 15, 2011, 2 pages.
Final Office Action for U.S. Appl. No. 12/072,187 mailed Jun. 13, 2011, 21 pages.
Non-final Office Action for U.S. Appl. No. 12/072,187 mailed Nov. 30, 2010, 17 pages.
Non-final Office Action for U.S. Appl. No. 12/892,280 mailed Nov. 6, 2012, 4 pages.
Non-final Office Action for U.S. Appl. No. 13/083,110 mailed Dec. 12, 2012, 9 pages.
International Search Report for PCT/US2009/057140 mailed Nov. 9, 2009, 2 pages.
Examiner's Answer to Appeal Brief for U.S. Appl. No. 12/323,385 mailed Feb. 21, 2013, 11 pages.
Final Office Action for U.S. Appl. No. 12/625,341 mailed Feb. 12, 2013, 10 pages.
Advisory Action for U.S. Appl. No. 12/625,341 mailed Apr. 25, 2013, 6 pages.
Non-final Office Action for U.S. Appl. No. 12/625,341 mailed Oct. 16, 2012, 8 pages.
Non-final Office Action for U.S. Appl. No. 12/323,385 mailed Sep. 21, 2011, 10 pages.
Final Office Action for U.S. Appl. No. 12/323,385 mailed Mar. 6, 2012, 12 pages.
Final Office Action for U.S. Appl. No. 12/751,860 mailed Nov. 5, 2012, 6 pages.
Non-final Office Action for U.S. Appl. No. 12/751,860 mailed Jul. 18, 2012, 8 pages.
Final Office Action for U.S. Appl. No. 13/275,798 mailed Jun. 27, 2013, 10 pages.
Non-final Office Action for U.S. Appl. No. 13/275,798 mailed Mar. 1, 2013, 8 pages.
Final Office Action for U.S. Appl. No. 13/177,233 mailed Mar. 29, 2013, 9 pages.
Advisory Action for U.S. Appl. No. 13/177,233 mailed Jul. 17, 2013, 3 pages.
Non-final Office Action for U.S. Appl. No. 13/177,233 mailed Dec. 17, 2012, 7 pages.
Non-final Office Action for U.S. Appl. No. 10/804,958 mailed Jul. 22, 2009, 8 pages.
Final Office Action for U.S. Appl. No. 10/804,958 mailed Jun. 11, 2008, 9 pages.
Non-final Office Action for U.S. Appl. No. 10/804,958 mailed Aug. 30, 2013, 11 pages.
Notice of Allowance for U.S. Appl. No. 10/804,958 mailed May 24, 2013, 8 pages.
Decision on Appeal for U.S. Appl. No. 10/804,958 mailed Apr. 18, 2013, 9 pages.
Examiner's Answer to Appeal Brief for U.S. Appl. No. 10/804,958 mailed Apr. 29, 2010, 12 pages.
Final Office Action for U.S. Appl. No. 10/804,958 mailed Oct. 9, 2007, 8 pages.
Non-final Office Action for U.S. Appl. No. 10/804,958 mailed Jun. 15, 2007, 7 pages.
Final Office Action for U.S. Appl. No. 10/804,958 mailed Nov. 3, 2006, 7 pages.
Non-final Office Action for U.S. Appl. No. 10/804,958 mailed Apr. 6, 2006, 7 pages.
Non-final Office Action for U.S. Appl. No. 10/804,958 mailed Sep. 21, 2005, 7 pages.
Notice of Allowance for U.S. Appl. No. 11/595,723 mailed Dec. 28, 2010, 8 pages.
Non-final Office Action for U.S. Appl. No. 11/595,723 mailed Jun. 21, 2010, 9 pages.
Non-final Office Action for U.S. Appl. No. 11/595,723 mailed Jan. 5, 2010 9 pages.
Advisory Action for U.S. Appl. No. 11/595,723 mailed Nov. 24, 2009, 3 pages.
Final Office Action for U.S. Appl. No. 11/595,723 mailed Jul. 8, 2009, 13 pages.
Non-final Office Action for U.S. Appl. No. 11/595,723 mailed Sep. 25, 2008, 13 pages.
Final Office Action for U.S. Appl. No. 11/595,723 mailed Apr. 11, 2008, 12 pages.
Non-final Office Action for U.S. Appl. No. 11/595,723 mailed Jun. 7, 2007 18 pages.
Examiner's Answer to Appeal Brief for U.S. Appl. No. 11/975,440 mailed Oct. 22, 2010, 17 pages.
Final Office Action for U.S. Appl. No. 11/975,440 mailed Mar. 8, 2010, 10 pages.
Non-final Office Action for U.S. Appl. No. 11/975,440 mailed Oct. 28, 2009, 7 pages.
Non-final Office Action for U.S. Appl. No. 11/975,440 mailed Jul. 10, 2009, 6 pages.
Notice of Allowance for U.S. Appl. No. 12/566,191 mailed May 24, 2011, 5 pages.
Final Office Action for U.S. Appl. No. 12/566,191 mailed Feb. 15, 2011, 8 pages.
Non-Final Office Action for U.S. Appl. No. 12/566,191 mailed Sep. 30, 2010, 8 pages.
Monro et al., "Holey Fibers with random cladding distributions," Optic Letters, vol. 25, No. 4, Feb. 15, 2000, 3 pages.
Notice of Allowance for U.S. Appl. No. 11/499,572 mailed Jul. 1, 2010, 7 pages.
Advisory Action for U.S. Appl. No. 11/499,572 mailed Jan. 27, 2010, 3 pages.
Final Office Action for U.S. Appl. No. 11/499,572 mailed Aug. 12, 2009, 9 pages.
Advisory Action for U.S. Appl. No. 11/499,572 mailed May 29, 2009, 3 pages.
Final Office Action for U.S. Appl. No. 11/499,572 mailed Dec. 26, 2008, 8 pages.
Non-final Office Action for U.S. Appl. No. 11/499,572 mailed Jun. 13, 2008, 7 pages.

(56) References Cited

OTHER PUBLICATIONS

Notice of Allowance for U.S. Appl. No. 12/012,144 mailed Feb. 10, 2009, 6 pages.
Non-final Office Action for U.S. Appl. No. 12/012,144 mailed Jul. 15, 2008, 5 pages.
Notice of Allowance for U.S. Appl. No. 11/712,168 mailed Apr. 21, 2010, 9 pages.
Notice of Allowance for U.S. Appl. No. 11/712,168 mailed Sep. 18, 2009, 9 pages.
Notice of Allowance for U.S. Appl. No. 11/712,168 mailed Jun. 1, 2009, 7 pages.
Notice of Allowance for U.S. Appl. No. 11/712,168 mailed Apr. 7, 2009, 9 pages.
Advisory Action for U.S. Appl. No. 11/712,168 mailed Oct. 20, 2008, 3 pages.
Final Office Action for U.S. Appl. No. 11/712,168 mailed Jul. 24, 2008, 11 pages.
Non-final Office Action for U.S. Appl. No. 11/712,168 mailed Oct. 9, 2007, 7 pages.
Advisory Action for U.S. Appl. No. 11/809,390 mailed Dec. 14, 2009, 2 pages.
Final Office Action for U.S. Appl. No. 11/809,390 mailed Sep. 25, 2009, 12 pages.
Non-final Office Action for U.S. Appl. No. 11/809,390 mailed Mar. 11, 2009, 9 pages.
Notice of Allowance for U.S. Appl. No. 11/809,390 mailed Nov. 18, 2008, 7 pages.
Non-final Office Action for U.S. Appl. No. 11/809,390 mailed Jul. 25, 2008, 10 pages.
Non-final Office Action for U.S. Appl. No. 11/439,070 mailed Jun. 17, 2009, 9 pages.
Non-final Office Action for U.S. Appl. No. 11/439,070 mailed Oct. 17, 2008, 13 pages.
Non-final Office Action for U.S. Appl. No. 11/439,070 mailed Jan. 11, 2008, 11 pages.
Non-final Office Action for U.S. Appl. No. 11/439,070 mailed May 16, 2007, 16 pages.
Final Office Action for U.S. Appl. No. 12/229,810 mailed Jun. 9, 2011, 16 pages.
Non-final Office Action for U.S. Appl. No. 12/229,810 mailed Dec. 23, 2010, 16 pages.
Final Office Action for U.S. Appl. No. 13/083,110 mailed Aug. 5, 2013, 13 pages.
Notice of Allowance for U.S. Appl. No. 12/417,250 mailed Nov. 9, 2011, 8 pages.
Decision on Appeal for U.S. Appl. No. 11/975,440 mailed Nov. 4, 2013, 10 pages.
Advisory Action for U.S. Appl. No. 13/083,110 mailed Nov. 12, 2013, 3 pages.
Advisory Action for U.S. Appl. No. 13/275,798 mailed Sep. 12, 2013, 2 pages.
Examiner's Answer to the Appeal Brief for U.S. Appl. No. 12/072,187 mailed Dec. 19, 2014, 25 pages.
Final Office Action for U.S. Appl. No. 13/083,110 mailed Nov. 7, 2014, 20 pages.
Non-Final Office Action for U.S. Appl. No. 13/362,474 mailed Dec. 5, 2014, 8 pages.
Non-Final Office Action for U.S. Appl. No. 13/089,692 mailed Dec. 2, 2014, 7 pages.
Notice of Allowance for U.S. Appl. No. 13/537,753 mailed Dec. 12, 2014, 7 pages.
Advisory Action for U.S. Appl. No. 13/275,842 mailed Nov. 20, 2014, 3 pages.
Non-Final Office Action for U.S. Appl. No. 13/648,811 mailed Oct. 24, 2014, 10 pages.
Non-final Office Action for U.S. Appl. No. 13/479,846 mailed Sep. 13, 2013, 11 pages.
Non-final Office Action for U.S. Appl. No. 13/613,759 mailed Sep. 20, 2013, 10 pages.
Tanji et al., "Optical Fiber Cabling Technologies for Flexible Access Network," Optical Fiber Technology, Academic Press, London, US, vol. 14, No. 3, Jul. 1, 2008, 8 pages.
Non-final Office Action for U.S. Appl. No. 12/072,187 mailed Dec. 26, 2013, 25 pages.
Final Office Action for U.S. Appl. No. 10/804,958 mailed Mar. 11, 2014, 13 pages.
Notice of Allowance for U.S. Appl. No. 11/975,440 mailed Jan. 15, 2014, 7 pages.
Non-final Office Action for U.S. Appl. No. 13/087,765 mailed Sep. 18, 2013, 8 pages.
Final Office Action for U.S. Appl. No. 13/479,846 mailed Feb. 14, 2014, 11 pages.
Final Office Action for U.S. Appl. No. 13/613,759 mailed Jan. 27, 2014, 13 pages.
Non-final Office Action for U.S. Appl. No. 13/083,110 mailed Mar. 18, 2014, 14 pages.
International Search Report for PCT/US2011/030466 mailed Aug. 5, 2011, 4 pages.
Non-final Office Action for U.S. Appl. No. 13/094,572 mailed Jan. 18, 2013, 17 pages.
Final Office Action for U.S. Appl. No. 13/094,572 mailed Jul. 8, 2013, 13 pages.
Advisory Action for U.S. Appl. No. 13/094,572 mailed Oct. 7, 2013, 2 pages.
Non-final Office Action for U.S. Appl. No. 13/094,572 mailed Mar. 4, 2014, 14 pages.
Advisory Action for U.S. Appl. No. 13/613,759 mailed Apr. 7, 2014, 3 pages.
Non-final Office Action for U.S. Appl. No. 13/649,377 mailed Jan. 31, 2014, 5 pages.
International Search Report for PCT/US2011/030446 mailed Jul. 14, 2011, 3 pages.
International Search Report for PCT/US2011/030448 mailed Jul. 20, 2011, 5 pages.
Advisory Action for U.S. Appl. No. 10/804,958 mailed Jun. 26, 2014, 4 pages.
Notice of Allowance for U.S. Appl. No. 11/975,440 mailed Apr. 30, 2014, 8 pages.
Final Office Action for U.S. Appl. No. 12/072,187 mailed May 27, 2014, 27 pages.
Non-final Office Action for U.S. Appl. No. 13/089,692 mailed Jan. 13, 2014, 8 pages.
Non-final Office Action for U.S. Appl. No. 13/089,692 mailed May 5, 2014, 7 pages.
Final Office Action for U.S. Appl. No. 13/089,692 mailed Aug. 13, 2014, 8 pages.
Advisory Action for U.S. Appl. No. 13/089,692 mailed Oct. 22, 2014, 2 pages.
Notice of Allowance and Interview Summary for U.S. Appl. No. 13/094,572 mailed Aug. 7, 2014, 11 pages.
Examiner's Answer to the Appeal Brief for U.S. Appl. No. 13/275,798 mailed Aug. 26, 2014, 6 pages.
Advisory Action for U.S. Appl. No. 13/479,846 mailed May 8, 2014, 3 pages.
Non-final Office Action for U.S. Appl. No. 13/537,753 mailed Mar. 27, 2014, 7 pages.
Notice of Allowance for U.S. Appl. No. 13/537,753 mailed Aug. 21, 2014, 7 pages.
Examiner's Answer to the Appeal Brief for U.S. Appl. No. 13/613,759 mailed Aug. 18, 2014, 6 pages.
Final Office Action for U.S. Appl. No. 13/649,377 mailed May 29, 2014, 8 pages.
Non-final Office Action for U.S. Appl. No. 14/093,636 mailed Oct. 10, 2014, 6 pages.
Non-final Office Action for U.S. Appl. No. 13/275,842 mailed Nov. 13, 2013, 7 pages.
Final Office Action for U.S. Appl. No. 13/275,842 mailed Aug. 28, 2014, 20 pages.

\* cited by examiner

FIBER OPTIC TERMINALS, SYSTEMS, AND METHODS FOR NETWORK SERVICE MANAGEMENT

RELATED APPLICATIONS

This is a continuation of U.S. patent application Ser. No. 12/630,938 filed on Dec. 4, 2009, the content of which is relied upon and incorporated herein by reference in its entirety, and the benefit of priority under 35 U.S.C. §120 is hereby claimed.

BACKGROUND

1. Field of the Disclosure

The technology of the disclosure relates to fiber optic terminals, systems, and methods for providing differentiated network services and/or differentiated network service overlays to subscribers of a fiber optic network.

2. Technical Background

To provide improved performance to subscribers, communication and data networks are increasingly employing optical fiber. The benefits of optical fiber are well known and include higher signal-to-noise ratios and increased bandwidth. To further improve performance, fiber optic networks are increasingly providing optical fiber connectivity all the way to end subscribers. These initiatives include various fiber-to-the-premises (FTTP), fiber-to-the-home (FTTH), and other fiber initiatives (generally described as FTTx). In this regard, FIG. 1 illustrates an exemplary fiber optic network 10. The fiber optic network 10 in this example is a passive optical network (PON). A PON is a point-to-multipoint FTTx network architecture to enable an optical fiber to serve multiple premises. A PON configuration generally reduces the amount of optical fiber and central office equipment as compared with point-to-point optical network architectures.

The fiber optic network 10 in FIG. 1 provides optical signals from switching points 12 over a distribution network 13 comprised of fiber optic feeder cables 14. The switching points 12 include optical line terminals (OLTs) or forward lasers/return receivers 15 that convert electrical signals to and from optical signals. The optical signals may then be carried over the fiber optic feeder cables 14 to local convergence points (LCPs) 16. The LCPs 16 act as consolidation points for splicing and making cross-connections and interconnections, as well as providing locations for optical couplers and splitters. The optical couplers and splitters in the LCPs 16 enable a single optical fiber to serve multiple subscriber premises 20. Fiber optic cables 18, such as distribution cables, exit the LCPs 16 to carry optical signals between the fiber optic network 10 and the subscriber premises 20. Typical subscriber premises 20 include single-dwelling units (SDU), multi-dwelling units (MDU), businesses, and/or other facilities or buildings. End subscribers in the subscriber premises 20 may contain network devices configured to receive electrical signals as opposed to optical signals. Thus, optical network terminals (ONTs) and/or optical network units (ONUs) 21 may be provided at the subscriber premises 20 to convert optical signals received over the fiber optic cables 18 to electronic signals.

Because LCPs 16 are typically configured to service multiple premises 20, the fiber optic cables 18 leaving the LCPs 16 are typically run to one or more intermediate fiber distribution terminals (FDTs) 22. FDTs 22 facilitate FTTx applications by providing network access points to the fiber optic network 10 to groupings of subscriber premises 20. Optical interconnections to the subscriber premises 20 are typically provided via indoor/outdoor drop cables 24 that are optically interconnected with the fiber optic cables 18 within the FDTs 22. The FDTs 22 also provide a consolidated location for technicians or other installation personnel to make and protect splices and/or connections between the drop cables 24 and the fiber optic cables 18 as opposed to making splices and/or connections in sporadic locations.

The fiber optic network 10 is capable of providing different levels of network services to subscriber premises 20 and different end subscribers at multi-unit subscriber premises 20. In this manner, different end subscribers can be charged at different rates based on their selected level of service. For example, the fiber optic network 10 may be capable of providing a premium, faster data-rate service to subscriber premises 20. However, some end subscribers at subscriber premises 20 may not need or desire the bandwidth provided in the premium data service. In this regard, the ONT and/or ONU 21 deployed at the subscriber premises 20 may be configured to control the level of service to only allow a standard, slower data-rate service. This is because the fiber optic network 10 in FIG. 1 is homogeneous, meaning the highest level of service available is provided over all fiber optic feeder cables 14 and fiber optic cables 18 regardless of whether each subscriber premises 20 has subscribed to the highest level of service.

When setting up a PON, service operators must consider providing ONUs that support differentiated services, such as higher bandwidth services and/or packet delivery assured services to service future potential increased bandwidth needs and demands of end subscribers. Some examples of these services include Ethernet PON (EPON), Gigabit PON (GPON), ten (10) Gigabit EPON (10 G-EPON), 10 G-GPON, WDM-based network services, such as for example, Wave Division Multiplexing PON (WDM-PON). The ONUs must be configured to recognize and transfer PON services provided by the PON. One approach is to delay providing ONUs that support differentiated PON services until demand or need exists. The initial costs may be less using this approach. However, this approach would also require eventually swapping-out initially installed ONUs with ONUs that support the differentiated PON services supported by the PON, thus increasing total cost and potentially disrupting service to subscribers.

Another approach is to initially pre-position ONUs capable of supporting differentiated PON services (e.g., EPON, GPON, 10 G-EPON, 10 G-GPON, and WDM-PON) in advance of supporting revenue streams. This approach may be necessary if it is desired to provide certain end subscribers with differentiated services. It may also be desired to provide different types of PON services to different end subscribers which may be closely located to each other. For example, it may be desirable to service closely located business end subscribers and residential end subscribers off of the same network even though business subscribers typically subscribe to differentiated PON services. However, initial costs of providing ONUs capable of supporting differentiated PON services may be initially higher than using the delay approach.

SUMMARY OF THE DETAILED DESCRIPTION

Embodiments disclosed in the detailed description include fiber optic terminals, systems, and methods for providing different (i.e., differentiated) network services to subscribers of a fiber optic network. A network service refers to a technology or platform used to carry or deliver an application, product, or service. In certain embodiments, fiber optic terminals, systems, and methods are disclosed for providing more than one network service over a fiber optic network to subscribers supported by the same fiber optic terminal. As a result, the optical paths in the fiber optic terminal do not have to be homogeneous wherein each optical path would carry the same optical signals and thus the same network services. Thus, differentiated levels and/or types of network services can be provided to different subscribers supported by the same fiber optic terminal. Further, by providing multiple optical paths in the fiber optic terminal, additional network services can be migrated to a fiber optic terminal, wherein subscribers supported by the same fiber optic terminal can subscribe to different services. Further, the network services provided to a subscriber supported by the fiber optic terminal can be reconfigured by changing the optical path connected to the subscriber in the fiber optic terminal. Further, by employing the fiber optic terminal, it may not be necessary to provide or upgrade optical network terminals (ONTs) or optical network units (ONUs) for subscribers to discriminate between different types of network services since the optical paths in the fiber optic terminal are not homogeneous.

In this regard, in one embodiment, a fiber optic terminal is provided. The fiber optic terminal comprises a first optical path connected to a first network-side optical fiber providing a first network service to a first subscriber-side optical fiber. The fiber optic terminal also comprises a second optical path connected to a second network-side optical fiber providing a second network service different from the first network service to a second subscriber-side optical fiber. In this manner, different or differentiated network services can be provided to different subscribers supported by the same fiber optic terminal by connecting subscribers to an optical path in the fiber optic terminal providing the desired network services. The fiber optic terminal can become the management point to connect subscribers to the desired network services. The network services provided on the optical paths in the fiber optic terminals may also be overlays of multiple network services.

In other embodiments, methods of providing at least two different network services to subscribers supported by a fiber optic terminal are disclosed. In one embodiment, the method comprises providing a fiber optic terminal. The method also comprises connecting a first optical path in the fiber optic terminal to a first network-side optical fiber providing a first network service. The method further comprises connecting the first optical path to at least one first subscriber-side optical fiber to provide the first network service to at least one first subscriber connected to the at least one first subscriber-side optical fiber. The method also comprises connecting a second optical path in the fiber optic terminal to a second network-side optical fiber providing a second network service different from the first network service.

In other embodiments, fiber optic systems are disclosed. In one embodiment, a fiber optic system comprises a network-side fiber optic terminal. The network-side fiber optic terminal comprises a first network-side optical path connected to a first network-side optical fiber providing a first network service to a first optical fiber. The network-side fiber optic terminal also comprises a second network-side optical path connected to a second network-side optical fiber providing a second network service different from the first network service to a second optical fiber. The fiber optic system also comprises a first subscriber-side fiber optic terminal comprising a first optical path connected to the first optical fiber to provide the first network service to at least one first subscriber connected to the first subscriber-side fiber optic terminal. In this manner, the connection of the first subscriber-side terminal to the first optical fiber provides the first network service provided by the network-side fiber optic terminal to subscribers supported by the first subscriber-side fiber optic terminal. In this manner, the network service provided to the first subscriber-side network terminal is controlled by the connection of the first optical path to an optical fiber from the network-side fiber optic terminal.

The fiber optic terminals can be any type of fiber optic terminal. Examples include local convergence points (LCPs) and fiber distribution terminals (FDTs). The fiber optic terminals can support subscriber premises, end subscribers, or other subscribers on the network-side of end subscribers or subscriber premises. The first and/or second optical paths may include optical splitters to split the first and/or second network services provided to multiple subscribers supported by the fiber optic terminal. Further, the first and/or second optical paths may include non-split fiber optic connections to provide a network service carried over an optical path to a single subscriber supported by the fiber optic terminal.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION OF THE PREFERRED EMBODIMENTS

Figure 1:
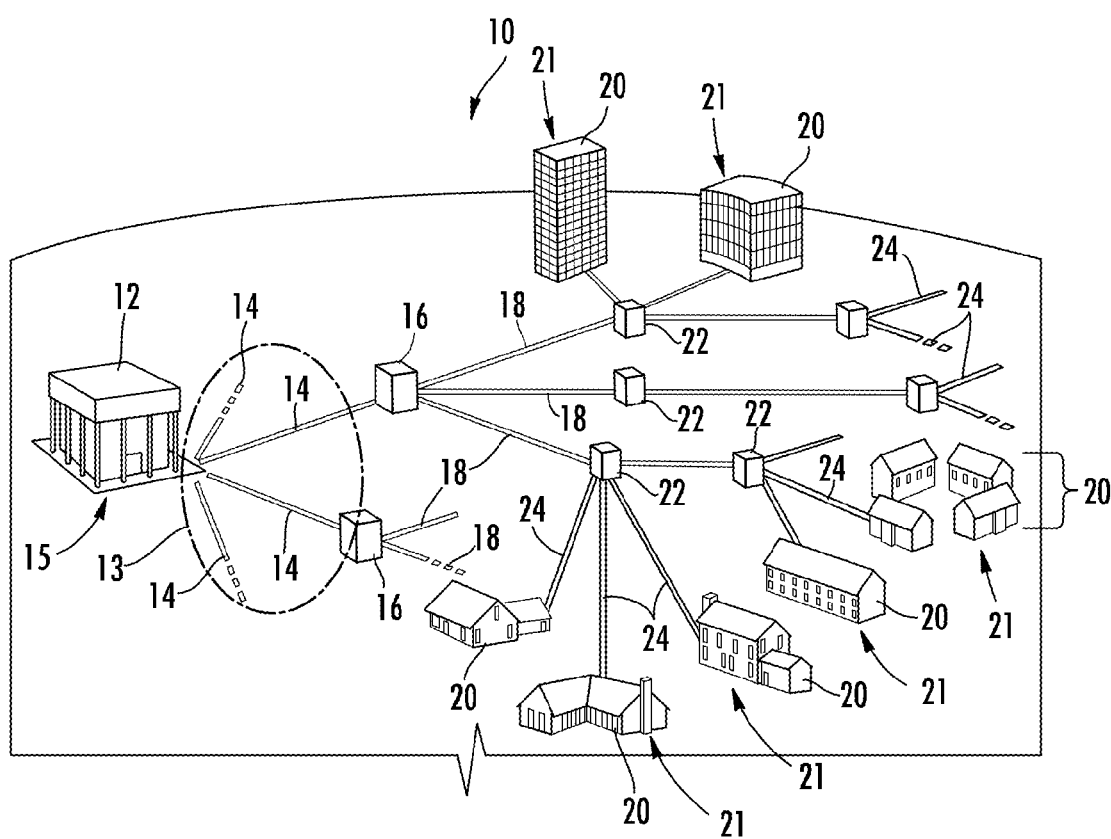
FIG. 1 illustrates an exemplary passive optical network (PON) that includes optical network terminals (ONTs) and optical network units (ONUs) for converting electrical signals to optical signals, and vice versa, and fiber optic terminals for carrying optical signals over a fiber optic network.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include fiber optic terminals, systems, and methods for providing different (i.e., differentiated) network services to subscribers of a fiber optic network. A network service refers to a technology or platform used to carry or deliver an application, product, or service. In certain embodiments, fiber optic terminals, systems, and methods are disclosed for providing more than one network service over a fiber optic network to subscribers supported by the same fiber optic terminal. As a result, the optical paths in the fiber optic terminal do not have to be homogeneous wherein each optical path would carry the same optical signals and thus the same network services. Thus, differentiated levels and/or types of network services can be provided to different subscribers supported by the same fiber optic terminal. Further, by providing multiple optical paths in the fiber optic terminal, additional network services can be migrated to a fiber optic terminal, wherein subscribers supported by the same fiber optic terminal can subscribe to different services. As an example, the fiber optic terminal may allow a service operator to design a network that initially provides Radio Frequency over Glass (RFoG) based services to subscribers, but the network and the fiber optic terminal may be later migrated to additionally provide differentiated PON services (e.g., EPON, GPON, 10 G-EPON, 10 G-GPON, and WDM-PON), including but not limited to higher bandwidth services, to subscribers supported by the fiber optic terminal. The network services provided to a subscriber supported by the fiber optic terminal can be reconfigured by changing the optical path connected to the subscriber in the fiber optic terminal. Further, by employing the fiber optic terminal, it may not be necessary to provide or upgrade optical network terminals (ONTs) or optical network units (ONUs) for subscribers to discriminate between different types of network services since the optical paths in the fiber optic terminal are not homogeneous.

In this regard, in one embodiment, a fiber optic terminal is provided. The fiber optic terminal comprises a first optical path connected to a first network-side optical fiber providing a first network service to a first subscriber-side optical fiber. The fiber optic terminal also comprises a second optical path connected to a second network-side optical fiber providing a second network service different from the first network service to a second subscriber-side optical fiber. In this manner, different network services can be provided to different subscribers supported by the same fiber optic terminal by connecting subscribers to an optical path in the fiber optic terminal providing the desired network services. The fiber optic terminal can become the management point to connect subscribers to the desired network services. The network services provided on the optical paths in the fiber optic terminals may also be overlays of multiple network services (e.g., provided over the same fiber).

The fiber optic terminals disclosed herein may be used for any type of fiber optic terminal, including but not limited to local convergence points (LCPs) and fiber distribution terminals (FDTs). For example, if the fiber optic terminal is configured as a local convergence point (LCP), the network-side or upstream fiber optic cable may be a feeder cable from a central office, head end, or switching point. The subscriber-side or downstream fiber optic cable may be a distribution cable. If the fiber optic terminal is configured as an FDT, the network-side or upstream fiber optic cable may be a distribution cable, and the subscriber-side or downstream fiber optic cable may be a drop cable. The drop cable may then be routed to an end subscriber(s) for FTTx applications.

Figure 2:
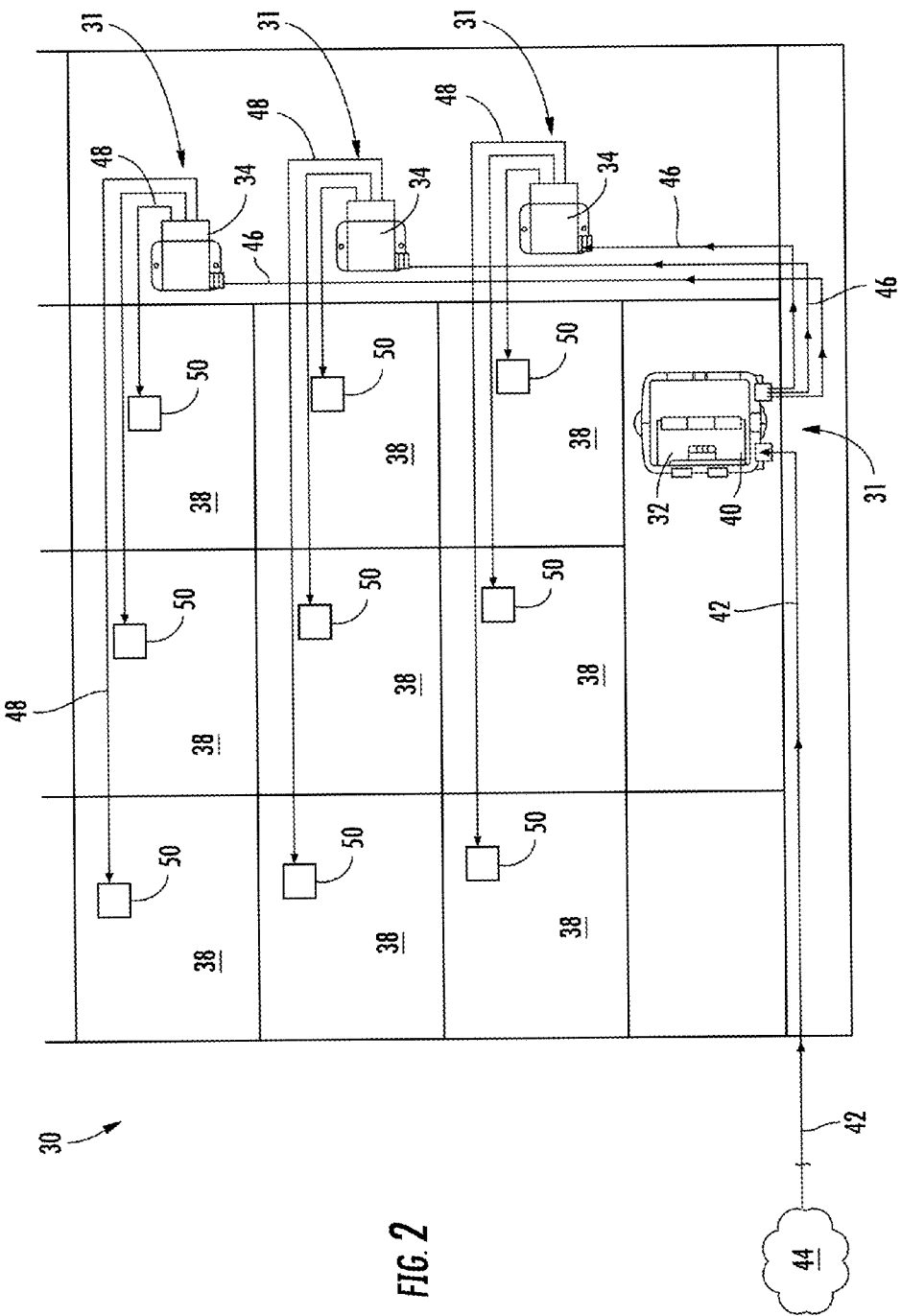
FIG. 2 illustrates an exemplary multi-dwelling unit (MDU) that includes fiber optic terminals that include local convergence points (LCPs) and fiber distribution terminals (FDTs) providing connectivity of end subscribers to the fiber optic network.

The fiber optic terminals disclosed herein may be installed in any location or premises. The fiber optic terminal may be employed for providing fiber optic network connectivity to end subscribers in multi-dwelling units (MDUs). In this regard, FIG. 2 illustrates a MDU 30 that includes fiber optic terminals 31 that may be employed as both LCPs 32 and FDTs 34. If the fiber optic terminal is configured as an FDT, the network-side or upstream fiber optic cable may be a distribution cable, and the subscriber-side or downstream fiber optic cable may be a drop cable. The drop cable may then be routed to an end subscriber(s) for FTTx applications.

The fiber optic terminals 31 provide convenient access points in a telecommunications or data network for a field technician to install and reconfigure optical fiber connections between network-side and subscriber-side fiber optic cables. The fiber optic terminals 31 are configured to allow one or more optical fibers provided in one or more network-side or upstream fiber optic cables to be easily and readily interconnected with one or more optical fibers in one or more subscriber-side or downstream fiber optic cables. By the term "subscriber-side," it is meant that optical fiber, fiber optic cable, or optical connection, as the case may be, is provided anywhere between the end subscriber and the fiber optic terminals 31. A subscriber-side fiber optic cable, optical fiber, or optical connection may be provided directly to an end subscriber or may be provided to one or more intermediate optical terminals or components before reaching an end subscriber. By the term "network-side," it is meant that the optical fiber, fiber optic cable, or optical connection, as the case may be, is provided between a fiber optic network, central switching point, central office, head end, or the like and the fiber optic terminals 31.

Figure 3:
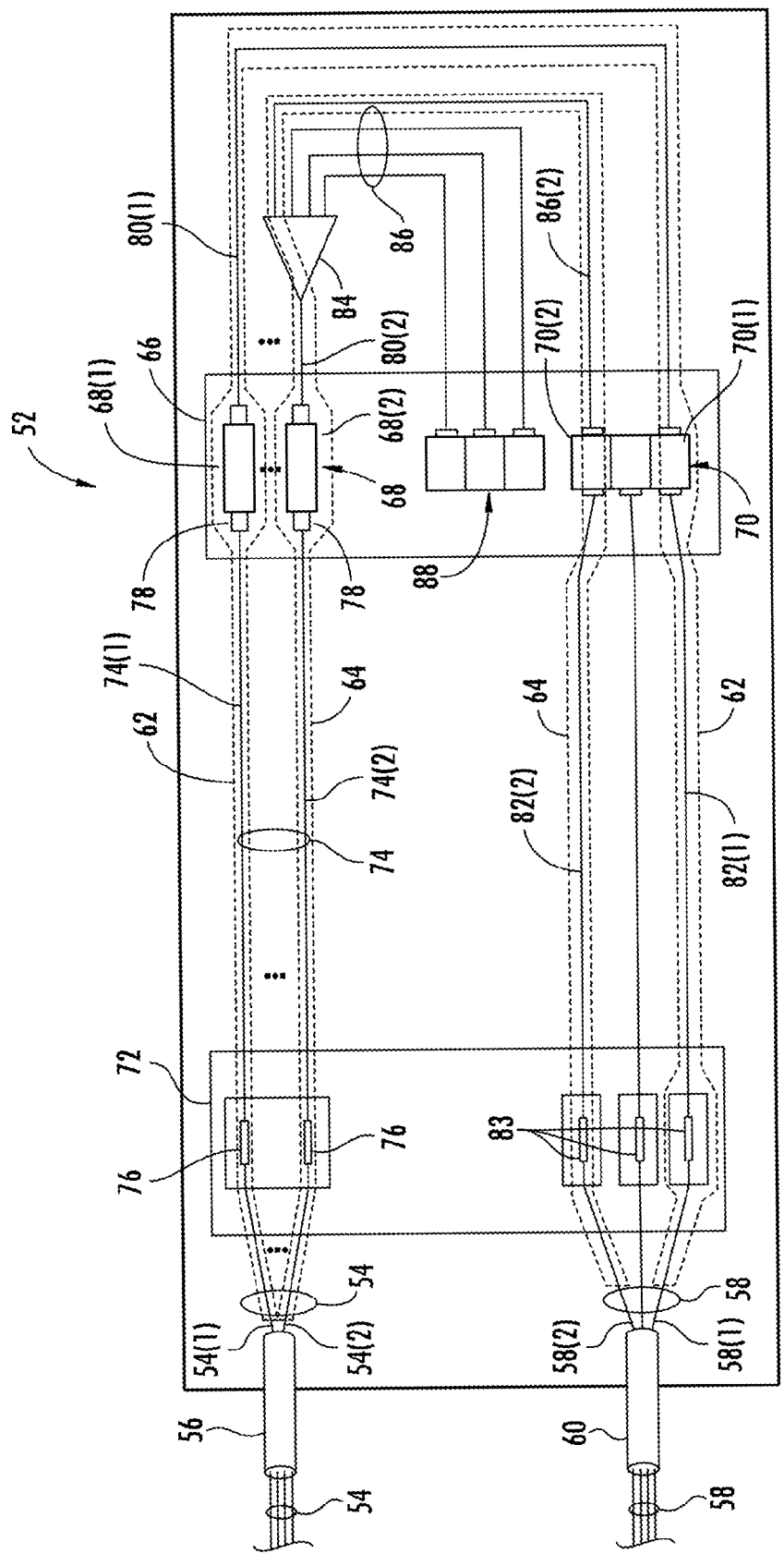
FIG. 3 is a block diagram of an exemplary fiber optic terminal employing a first non-split optical path and a second optical path employing an optical splitter, wherein each optical path supports different network services in a centralized manner.

Before discussing various embodiments of fiber optic terminals that may be employed starting at FIG. 3, the exemplary MDU 30 in FIG. 2 is first discussed in more detail. In this regard, the MDU 30 in this example includes nine (9) dwelling units 38 for illustrative purposes only. In this embodiment, the LCP 32 is positioned on the ground floor or basement in the illustrated embodiment; however, the LCP 32 could be positioned at any location relative to the MDU 30. The LCP 32 includes a cable assembly 40 that is optically connected to a network-side fiber optic cable 42. For example, the network-side fiber optic cable 42 may be a feeder cable optically connected to a central office (not shown) or switching point (not shown) through a fiber optic network 44. One or more subscriber-side optical fibers 46 carrying optical signals can be optically connected in or at the LCP 32 to the fiber optic network 44 and exit the LCP 32 to extend throughout the MDU. For example, the subscriber-side optical fibers 46 may be distribution cables. The network-side fiber optic cables 42 may be feeder cables. The subscriber-side optical fibers 46 carry optical signals to and from the LCP 32 received from the fiber optic network 44 and extend to each dwelling unit 38 via subscriber-side optical fibers 48 and eventually terminate at a subscriber termination point 50, such as an adapter in a wall outlet, an adapter in a floor panel, an adapter behind a ceiling tile, or the like such that the subscriber can optically connect to a subscriber-side optical fiber 48.

The optical fibers extended to the subscriber termination point 50 can be the subscriber-side optical fibers 46, or can be provided by subscriber-side optical fibers 48 from one or more intermediate FDTs 34. The FDTs 34 can be provided to simplify the routing and installation of the subscriber-side optical fibers 48 between the LCP 32 and the subscriber termination points 50 by allowing the subscriber-side optical fibers 48 to be grouped between the LCP 32 and FDTs 34 and then separated at the FDTs 34. The FDTs 34 are configured to receive the subscriber-side optical fibers 46 and provide the individual subscriber-side optical fibers 48 to the subscriber termination points 50. Accordingly, there are fewer optical fibers and/or fiber optic cables extending between the floors of the MDU 30, thus simplifying routing of optical fibers through the MDU 30. Although floors of the MDU 30 are described in the illustrated embodiments, it should be appreciated that FDTs 34 may be used to facilitate optical fiber routing to any layout of areas within the MDU 30. Further, although the subscriber-side optical fibers 48 and subscriber-side optical fibers 46 include arrows pointing in the direction of the subscriber termination points 50, it should be appreciated that optical signals may be passed in either direction as required for the particular application; the arrows are merely provided for illustrative purposes.

A block diagram of an exemplary embodiment of a fiber optic terminal 52 according to one embodiment is illustrated in FIG. 3. The fiber optic terminal 52 in FIG. 3 may be provided as the fiber optic terminals 31 in FIG. 2, including the LCPs 32 and FDTs 34 provided therein, as examples. As will be described in greater detail below, the fiber optic terminal 52 in this embodiment employs multiple optical paths that receive optical signals from a plurality of network-side optical fibers 54 disposed in a network-side fiber optic cable 56. The network-side optical fibers 54 provide optical signals for a plurality of network services. The fiber optic terminal 52 facilitates providing the plurality of network services to subscribers (not shown) over subscriber-side optical fibers 58 disposed in a subscriber-side fiber optic cable 60. In this manner, different network services can be provided to different subscribers supported by the same fiber optic terminal 52 by connecting subscribers to the optical path in the fiber optic terminal 52 providing the desired network services. In this regard, the fiber optic terminal 52 provides different network services to subscribers in a centralized manner. As a result, the optical paths in the fiber optic terminal 52 do not have to be homogeneous, meaning each optical path carries the same optical signals and thus the same network services.

Different levels and/or types of network services can be provided to different subscribers supported by the fiber optic terminal 52. For example, as illustrated in FIG. 3, a first optical path 62 provided in the fiber optic terminal 52 may be connected to a first network-side optical fiber 54(1) providing Radio Frequency over Glass (RFoG) based network services. RFoG is compatible with head-end equipment in existing hybrid fiber coaxial (HFC) networks, and may provide voice, video, data, and/or services. A second optical path 64 provided in the fiber optic terminal 52 may be connected to a second network-side optical fiber 54(2) providing Ethernet Passive Optical Network (EPON) based network services. Thus, a first subscriber-side optical fiber(s) 58(1) connected to the first optical path 62 and the first subscriber-side optical fiber(s) 54(1) provides RFoG-based network services to subscribers connect thereto. A second subscriber-side optical fiber(s) 58(2) connected to the second optical path 64 and the second network-side optical fiber 54(2) provides EPON-based network services in this embodiment. In this manner, the fiber optic terminal 52 allows providing different network services to different subscribers supported by the fiber optic terminal 52. Thus, discriminating between different types of network services through use of ONTs or ONUs at end subscribers may not be required to provide different network services to different subscribers supported by the fiber optic terminal 52. Further, if at a later time it is desired, for example, to provide EPON-based network services to the first subscriber-side optical fiber 58(1), the connection of the first subscriber-side optical fiber 58(1) can be moved or relocated to be connected to the second optical path 64 and the second network-side optical fiber 54(2) in the fiber optic terminal 52.

The fiber optic terminal 52 in FIG. 3 also supports overlaying of multiple network services in the first and second optical paths 62, 64. For example, optical signals providing EPON-based network services carried on the network-side optical fiber 54(2) may be overlaid onto optical signals providing RFoG-based network services carried on the same network-side optical fiber 54(1). Overlaying means providing multiple optical signals over the same optical fiber (e.g., using wave division multiplexing (WDM) or time division multiplexing (TDM)). Overlaying of optical signals is possible where the overlaid network services are provided by optical signals having different wavelengths. This provides for greater flexibility in providing enhanced network services. As an example, the first and second optical paths 62, 64 in the fiber optic terminal 52 may initially be connected to network-side optical fibers 54 that provide only one network service, for example, a RFoG-based network service. Later, when it is desired to provide enhanced bandwidth, additional network services, such as EPON-based or GPON-based network services as examples, can be overlaid on network-side optical fibers 54 such that one optical path 62 or 64 as the case may be, may provide network services using a combination of RFoG-based and EPON-based services to subscribers and the other optical path 64 or 62 may provide only network services using RFoG. For example, RFoG may provide video services, and EPON or GPON provide data and voice services. Thus, the providing of non-homogeneous optical paths in the fiber optic terminal 52 facilitates easy migration to differentiated network services, which includes but is not limited to higher bandwidth network services.

With continuing reference to FIG. 3, the fiber optic terminal 52, the network-side optical fibers 54 from the network-side fiber optic cable 56, and the subscriber-side optical fibers 58 from the subscriber-side fiber optic cable 60 are optically connected to each other at a fiber optic connection panel 66 disposed in the fiber optic terminal 52 in this embodiment. The fiber optic connection panel 66 can be a panel or module that contains or supports a plurality of optical fiber connections. The fiber optic connection panel 66 may support one or more input fiber optic adapters 68 and one or more output fiber optic adapters 70 for supporting optical fiber connections. The input and output fiber optic adapters 68, 70 support making optical connections between the one or more network-side optical fibers 54 from the network-side fiber optic cable 56 and the one or more subscriber-side optical fibers 58 from the subscriber-side fiber optic cable 60. The input and output fiber optic adapters 68, 70 may be of any connection type, including but not limited to SC, LC, MTP, FC, ST, MU, or MTRJ.

With continuing reference to FIG. 3, to make an optical connection between the one or more network-side optical fibers 54, the one or more network-side optical fibers 54 are spliced in a splice tray 72 to an input pigtail(s) 74 in a network splice(s) 76 in this embodiment. However, the fiber optic terminal 52 could be configured to not require splicing. The input pigtail(s) 74 is connected on a connectorized end(s) 78 to the input fiber optic adapter(s) 68. In this embodiment, a first input pigtail 74(1) optically connected to the first network-side optical fiber 54(1) is connected to an input fiber optic adapter 68(1). An output fiber 80(1) is connected between the input fiber optic adapter 68(1) and an output fiber optic adapter 70(1) to optically connect the network-side optical fiber 54(1) to an output pigtail 82(1). The output pigtail 82(1) is spliced, via splices 83 in the splice tray 72, into the subscriber-side optical fiber 58(1) in the subscriber-side fiber optic cable 60. Again, splicing may not be required. In this manner, an optical connection is made between the network-side optical fiber 54(1) and subscriber-side network optical fiber(s) 58(1) to provide the first network service to a subscriber connected to the subscriber-side optical 58(1) fiber.

Also in this embodiment of the fiber optic terminal 52, a second input pigtail 74(2) optically connected to the second network-side optical fiber 54(2) is connected to an input fiber optic adapter 68(2). The input fiber optic adapter 68(2) is connected to an output fiber 80(2) which is an input into an optical splitter 84 provided in the second optical path 64. The optical splitter 84 is configured to split optical signals carried by the input fiber 80(2), via connection to the input fiber optic adapter 68(2), into a plurality of optical signals carried by multiple connectorized output fibers 86(2). For example, the optical splitter 84 in FIG. 3 is a 1×4 optical splitter, but any other type of splitting configuration may be provided. Providing the optical splitter 84 in the second optical path 64 allows more than one subscriber-side optical fiber 58 to be connected to the second optical path 64 and thus receive the second network service, if desired. The splitter configuration of the optical splitter 84 depends on the number of subscribers desired to be provided with the second network service in this embodiment. For example, a 1×8 optical splitter allows the second optical path 64 to be connected to up to eight (8) subscriber-side optical fibers 58.

With continuing reference to FIG. 3, one or more of the output fibers 86 can then be connected into one or more of the output fiber optic adapters 70 to optically connect to the output pigtails 82. In this embodiment, one of the output fibers 86(2) is connected to the output fiber optic adapter 70(2), which is optically connected to output pigtail 82(2). The output pigtail 82(2) is spliced, via the splice tray 72, into the subscriber-side optical fiber(s) 58(2) in the subscriber-side fiber optic cable 60. In this manner, an optical connection is made between the network-side optical fiber 54(2) and subscriber-side optical fiber(s) 58(2) to provide the second network service to a subscriber connected to the subscriber-side optical fiber 58(2).

If it is later desired to change, move, or relocate the subscriber-side optical fiber 58(1) to the second network service over the second optical path 64, the output pigtail 82(1) can be connected to the optical splitter 84 through the fiber optic adapter 70 easily and quickly. In this regard, one of the output fibers 86 from the optical splitter 84 may need to be moved from a parking area 88, where unused output fibers are parked, to a connection with an available output fiber optic adapter 70 that is connected to the output pigtail 82(1). In the embodiment shown in FIG. 3, it is not possible to connect more than one subscriber-side optical fiber 58 to the first optical path 62 to receive the first network service since only one input fiber optic adapter 68(1) is provided in the first optical path 62. If it is desired to provide the ability for multiple subscriber-side optical fibers 58 to be connected to the first optical path 62 to receive the first network services, the fiber optic terminal 52 can be expanded by also providing an optical splitter in the first optical path 62.

Figure 4:
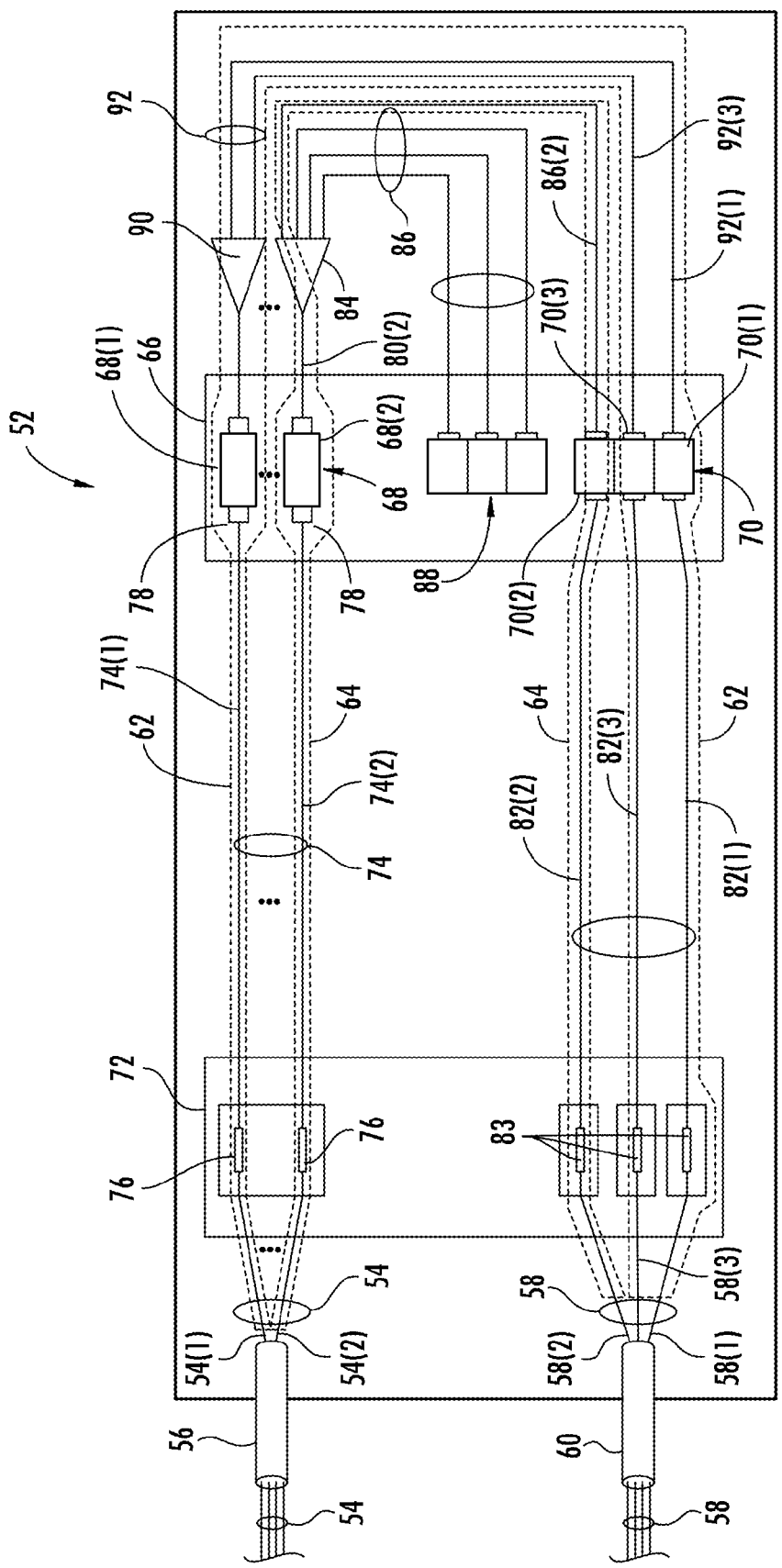
FIG. 4 is a block diagram of another exemplary fiber optic terminal employing optical splitters in each optical path, wherein each optical path supports different network services in a centralized manner.

In this regard, FIG. 4 provides the fiber optic terminal 52 of FIG. 3, except that an optical splitter 90 is also provided in the first optical path 62. In this manner, network services from the first network-side optical fiber 54(1) can also be split into a plurality of output signals carried by multiple connectorized output fibers 92 that can be connected to one (1) or more subscriber-side optical fiber 58 to provide expansion of the first network service to additional subscribers, if needed or desired. Connectorized output fibers 92(1), 92(2) from the optical splitter 90 are connected to output fiber optic adapters 70(1), 70(3), which are in turn connected to output pigtails 82(1), 82(3), respectively. The output pigtails 82(1), 82(3) are connected to subscriber-side optical fibers 58(1), 58(3). In this manner, the first network services provided in the first optical path 62 can be provided to two (2) subscribers connected to subscriber-side optical fibers 58(1), 58(3) in this embodiment. If it is desired to move, change, or relocate any subscribers from the first network service to the second network service, or vice versa, the subscriber-side optical fiber(s) 58 connected to such subscriber can be moved or relocated from the first optical path 62 (e.g., the optical splitter 90) to the second optical path 64 (e.g., the optical splitter 84), or vice versa. For example, if it is desired to move, change, or relocate a subscriber connected to subscriber-side optical fiber 58(1) from the first network service to the second network service, the output pigtail 82(1) can be moved or relocated to the output fiber optic adapter 70(2), or alternatively, output fiber 92(1) from the optical splitter 90 can be moved or relocated to output fiber optic adapter 70(2).

Figure 5:
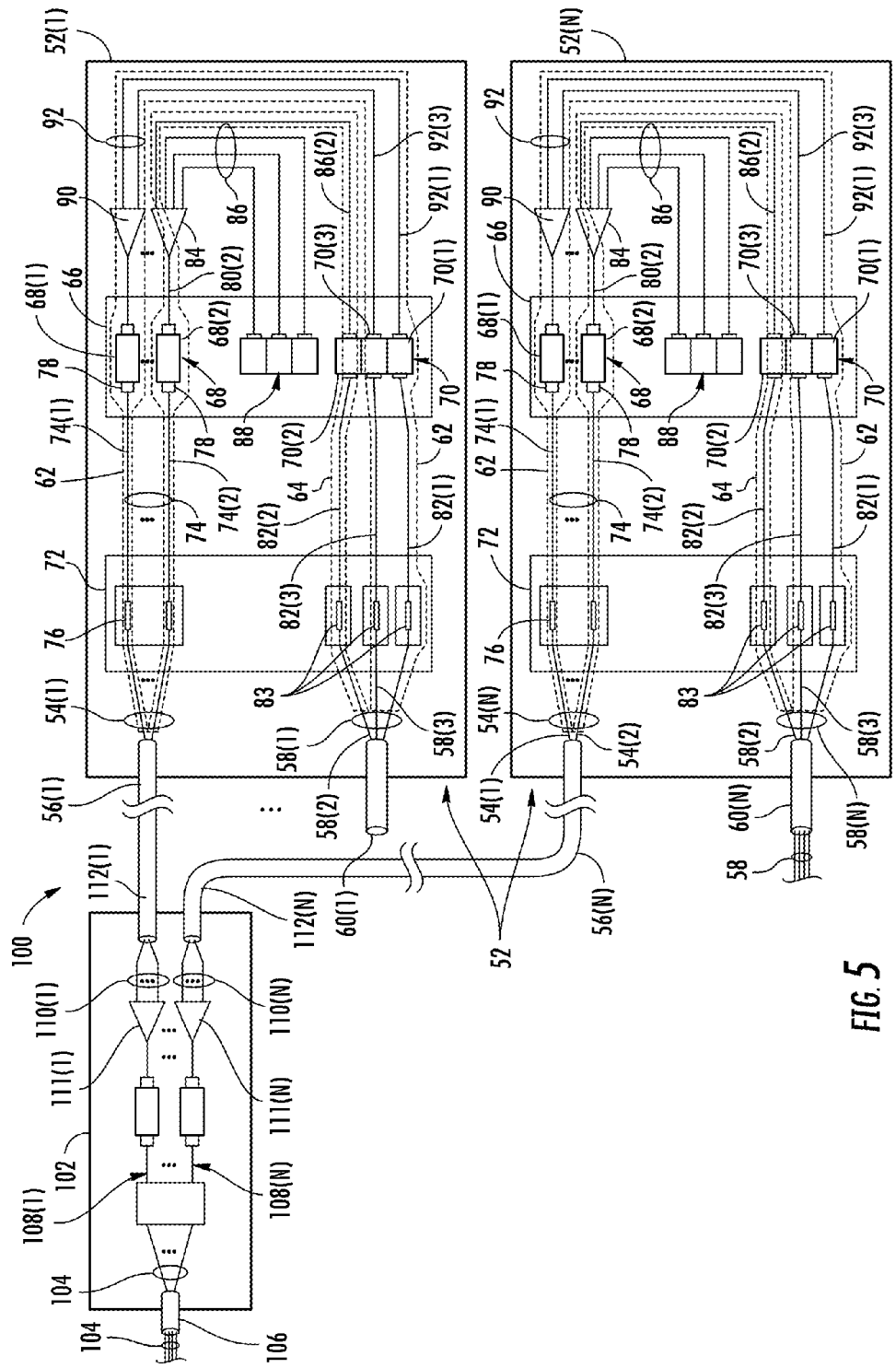
FIG. 5 is a block diagram of an exemplary network-side fiber optic terminal providing one or more network services to subscribers supported by one or more subscriber-side fiber optic terminal(s) connected to the network-side fiber optic terminal in a distributed manner.

FIG. 5 illustrates another embodiment where a fiber optic system 100 is provided that includes at least one network-side fiber optic terminal 102 to support providing multiple network services to multiple fiber optic terminals in a distributed manner. In this embodiment, the network-side fiber optic terminal 102 is configured to provide optical signals for more than one network service from a fiber optic network (not shown) received over multiple network-side optical fibers 104 provided in a network-side fiber optical cable 106. In this regard, the network-side fiber optic terminal 102 may be configured like any configurations provided for the fiber optic terminals 52 previously discussed, as an example. The network-side fiber optic terminal 102 can be configured to provide multiple (N) optical paths 108(1)-108(N) to provide multiple network services like configured in the fiber optic terminals 52 previously described.

In this embodiment, subscriber-side optical fibers 110(1) provided in a fiber optic cable 112(1) are connected to a network service to the optical path 108(1) in the network-side fiber optic terminal 102 to provide a first network service. The subscriber-side optical fibers 110(1) carry optical signals split by an optical splitter 111(1). The optical signals split by optical splitter 111(1) are carried by network-side optical fibers 54(1) routed to a first subscriber-side fiber optic terminal 52(1) to provide the first network service to the first subscriber-side fiber optic terminal 52(1). The first subscriber-side fiber optic terminal 52(1) can be the fiber optic terminals 52 previously described. In this manner, the network service provided to subscribers supported by the first subscriber-side fiber optic terminal 52(1) is provided through the optical splitter 111(1) in the network-side fiber optic terminal 102 in a distributed manner. However, if optical path 108(N) is connected to network-side optical fibers 106 providing a different network service from the network service provided to the optical path 108(1), and the network-side optical fibers 54(1) are connected to the subscriber-side optical fibers 110(N), a different network service would be provided to the first subscriber-side fiber optic terminal 52(N). Thus, the number of optical paths 108(1)-108(N) in the network-side fiber optic terminal 102 determines the number of different unique network services or network service overlays that can be provided to the first subscriber-side fiber optic terminal 52(1) in the fiber optic system 100 of FIG. 5.

Further, if more than one network service is provided in the subscriber-side optical fibers 110(1) in the network-side fiber optic terminal 102 to the first subscriber-side fiber optic terminal 52(1), the network services provided to subscribers supported by the first subscriber-side fiber optic terminal 52(1) can also be determined in the subscriber-side fiber optic terminal 52 to provide a distributed configuring of network services. Different network services can be provided in different optical paths, for example, the first and second optical paths 62, 64, within the first subscriber-side fiber optic terminal 52(1) and provided to different subscriber-side optical fibers 58(1), as previously described with regard to FIGS. 3 and 4. For example, the optical splitter 111(1) in the fiber optic terminal 102 may be a 1×4 splitter and the optical splitters 84, 90 in the fiber optic terminal 52(1) may be 1×2 splitters, as opposed to, for example, only providing a 1×8 optical splitter in the fiber optic terminal 52(1).

FIG. 5 also includes additional subscriber-side fiber optic terminals 52 signified by the inclusion of subscriber-side fiber optic terminal 52(N) to signify that "N" number of subscriber-side fiber optic terminals 52 can be provided, wherein "N" is any natural number. Multiple subscriber-side fiber optic terminals among subscriber-side fiber optic terminals 52(1)-52(N) may be provided, wherein each subscriber-side fiber optic terminal 52 is connected to a different optical path among optical paths 108(1)-108(N) in the network-side fiber optic terminal 102. Some or all of the optical paths 108(1)-108(N) may have optical splitters 111(1)-111(N) to split optical signals from the network-side optical fibers 106. In this regard, different network services can be provided to multiple subscriber-side fiber optic terminals 52(1)-52(N). The network services provided to the subscriber-side fiber optic terminals 52(1)-52(N) are determined by the optical splitters 111(1)-111(N) determining the optical paths 108(1)-108(N) connected to the subscriber-side fiber optic terminals 52(1)-52(N). Thus, for example, if it is desired to provide different network services to subscribers located in close proximity, multiple subscriber-side fiber optic terminals 52(1)-52(N) can be provided and co-located. Each subscriber-side fiber optic terminal 52(1)-52(N) would provide one or more network services from the network-side fiber optic terminal 102. Subscribers can be connected to the subscriber-side fiber optic terminals 52(1)-52(N) based on the network service to be provided.

The choice between a centralized splitting model, such as for example provided in FIGS. 3 and 4, and a distributed splitting module, such as for example provided in FIG. 5, can be driven by splitting strategy, including subscriber density and anticipated future changes. A distributed splitting approach may work well in lower-density areas or places with space constraints that limit fiber optic cable sizes. A centralized splitting approach may provide less stranded ports, and efficiently utilize network electronics.

Figure 6:
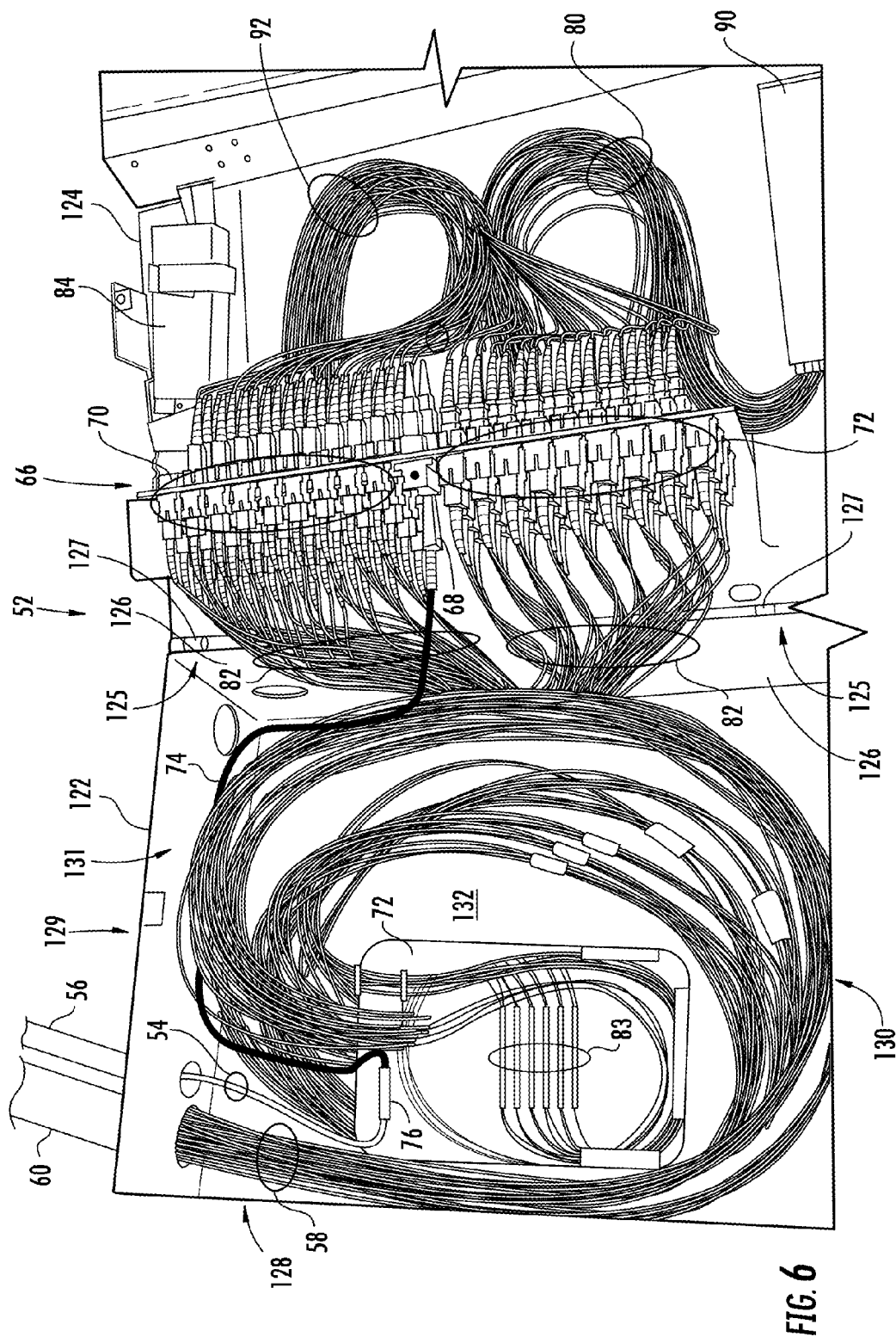
FIG. 6 is an exemplary fiber optic terminal that may be employed as any of the aforementioned fiber optic terminals.
Figure 7:
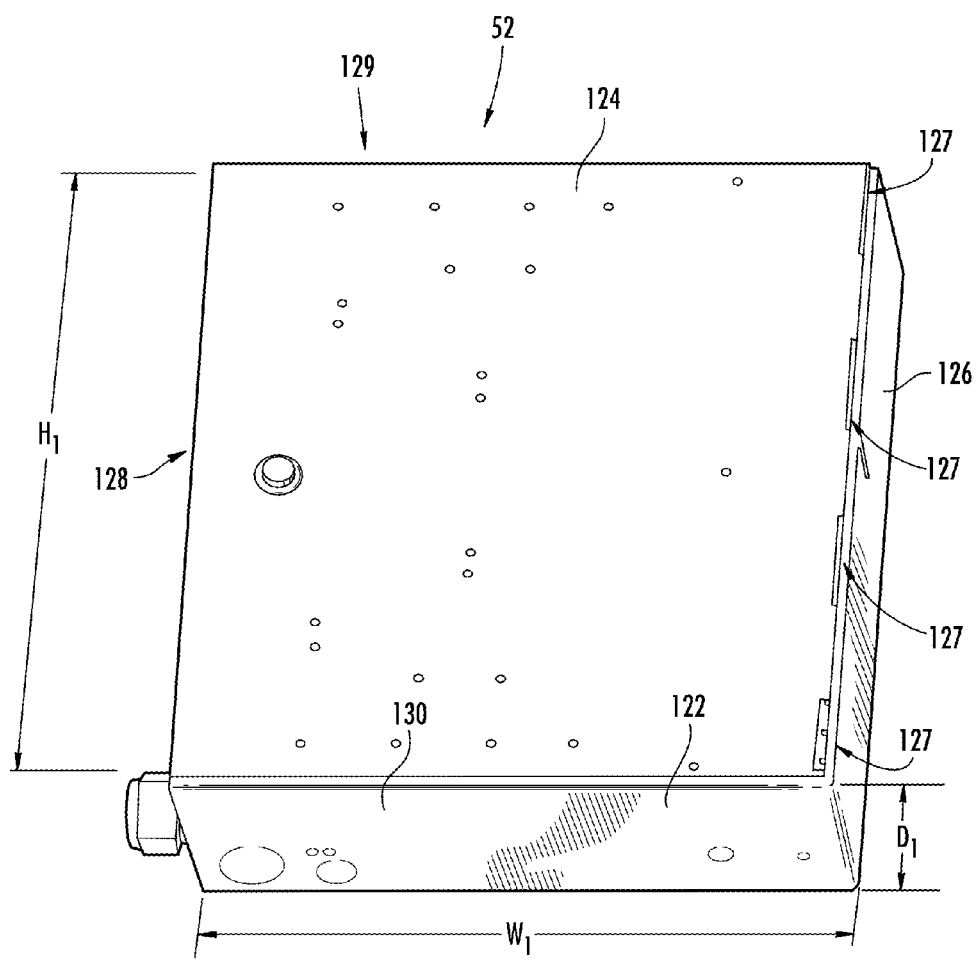
FIG. 7 illustrates the fiber optic terminal of FIG. 6 with a terminal cover closed.

FIGS. 6 and 7 illustrate a schematic view of an example fiber optic terminal that may be provided as the fiber optic terminal 52 in FIGS. 3-5 and will be described below in this regard. However, note that the subscriber-side fiber optic terminal 52 illustrated in FIGS. 6 and 7 and the components provided therein may be provided in the network-side fiber optic terminal 102 in FIG. 5 as well. In this regard, the subscriber-side fiber optic terminal 52 illustrated in FIG. 6 comprises a base 122 and a terminal cover 124 hingedly affixed to the base 122 and opened thereon. The base 122 and the terminal cover 124 may be made of a rigid material, such as aluminum, plastic, or thermoplastic, as examples. The base 122 and the terminal cover 124 serve to close off and protect the internal components of the subscriber-side fiber optic terminal 52 when the terminal cover 124 is closed on the base 122, as illustrated in FIG. 7.

With continuing reference to FIG. 6, the terminal cover 124 is generally rectangular in this embodiment, although other shapes are possible. The terminal cover 124 in this embodiment is hingedly affixed to the base 122 of similar form along an edge 125 of a right side wall 126 at one or more hinge locations 127 (see also, FIG. 7). In this manner, the terminal cover 124 can be rotated about the hinge locations 127 when the terminal cover 124 is opened from the base 122. The base 122 is also comprised of a left side wall 128 disposed opposite and generally parallel to the right side wall 126, both of which are attached or interconnected on ends to a top side wall 129 and bottom side wall 130 (see also, FIG. 7). The right side wall 126, left side wall 128, top side wall 129 and bottom side wall 130 are either attached as separate pieces, or portions bent upward from a single sheet of material in planes orthogonal or substantially orthogonal about a back wall 131. In this manner, an interior chamber 132 is formed within the base 122. The interior chamber 132 provides room for routing and/or storage of network-side and subscriber-side fiber optic cables 56, 60 and the network-side and subscriber-side optical fibers 54, 58 therein and making optical interconnections between the two, including through any intermediate optical components that may be provided in the subscriber-side fiber optic terminal 52, as will be described below.

With continuing reference to FIGS. 6 and 7, a technician can open the terminal cover 124 to access the interior chamber 132 of the subscriber-side fiber optic terminal 52, such as to install or reconfigure optical interconnections within the subscriber-side fiber optic terminal 52. After completion, the terminal cover 124 can be closed against the base 122 to close the subscriber-side fiber optic terminal 52, thus closing off access to the interior chamber 132. When the terminal cover 124 is closed in this example, as illustrated in FIG. 7, the subscriber-side fiber optic terminal 52 has the approximate dimensions of four hundred thirty (430) millimeters (mm) height ($H_1$), four hundred (400) mm width ($W_1$), and one hundred thirty-five (135) mm depth ($D_1$). However, the subscriber-side fiber optic terminal 52 is not limited to these dimensions and any dimensions desired are possible.

As illustrated in FIG. 6 and discussed in more detail herein, the subscriber-side fiber optic terminal 52 and its internal components facilitate making optical connections between optical fiber(s) provided by one or more network-side fiber optic cables 56 and one or more subscriber-side fiber optic cables 60 to establish a connection between an end subscriber and a fiber optic network. Both the network-side fiber optic cable 56 and the subscriber-side fiber optic cable 60 may be distribution cables. In this regard, as illustrated by example in FIG. 6, the network-side fiber optic cable 56 provides the one or more network-side optical fibers 54 configured to be optically connected to a fiber optic network for carrying optical signals to and from the fiber optic network. The subscriber-side fiber optic cable 60 also contains the subscriber-side optical fibers 58 which are configured to be run to or towards end subscribers directly or through one or more intermediate terminals and/or other optical components. Thus, when a network-side optical fiber(s) 54 provided in the network-side fiber optic cable 56 is optically connected to a subscriber-side optical fiber(s) 58 provided in the subscriber-side fiber optic cable 60 within the subscriber-side fiber optic terminal 52 as previously discussed, an optical connection can be established between a subscriber and a fiber optic network.

The one or more network-side optical fibers 54 from the network-side fiber optic cable 56 and the one or more subscriber-side optical fibers 58 from the subscriber-side fiber optic cable 60 are optically connected to each other at the fiber optic connection panel 66. The fiber optic connection panel 66 can be a panel or module that contains or supports a plurality of optical fiber connections. As previously discussed, the fiber optic connection panel 66 support one or more input fiber optic adapters 68 and output fiber optic adapters 70 for supporting optical fiber connections. The input and output fiber optic adapters 68, 70 support making optical connections between one or more network-side optical fibers 54 and the subscriber-side optical fibers 58. The subscriber-side fiber optic terminal 52 illustrated in FIG. 6 contains the optical splitters 84, 90 provided in the subscriber-side fiber optic terminal 52 illustrated in FIG. 6 and previously described. The remaining components illustrated in the subscriber-side fiber optic terminal 52 in FIG. 6 are the same components previously described above with regard to FIGS. 3 and 4 and thus will not be re-described here.

The network services that can be provided to subscribers include, but are not limited to, RFoG, ATM PON (APON), Broadband PON (BPON), EPON, GPON, 10 G-EPON, 10 G-GPON, and WDM-PON. The fiber optic terminals described herein can include, but are not limited to, LCPs and FDTs. For example, the fiber optic terminal as used herein can be a splice terminal, patch terminal or the like, or any combination thereof. If fiber optic connectors and/or adapters are provided in the fiber optic terminals, the fiber optic connectors and/or adapters may be for any type of optical connector, including but not limited to an LC, SC, MTP, FC, ST, MU, or MTRJ, without limitation. If optical splitters are provided in the fiber optic terminals, the optical splitters can be of any type or configuration, including without limitation, 1×2, 1×4, 1×8, 1×16, 1×32, 1×64, 1×128, and 2×2.

The fiber optic terminals disclosed herein may be used for any fiber optic distribution application, including but not limited to directly or intermediately routing fiber optic cables and optical fibers from a fiber optic network(s) to subscriber premises and end subscribers, including but not limited to various fiber-to-the-premises (FTTP), fiber-to-the-home (FTTH), fiber-to-the-business (FTTB), and other fiber initiatives (generally described as FTTx). Subscriber premises include, but are not limited to single-dwelling units (SDU), multi-dwelling units (MDU), businesses, and/or other facilities or buildings. The fiber optic terminals may be installed in any location, including an aerial location, buried, or disposed in a larger enclosure, such as a ground pedestal.

The network-side and subscriber-side fiber optic cables may be any type of fiber optic cable and include any type of optical fibers in any form. Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated.

Many modifications and other embodiments of the embodiments set forth herein will come to mind to one skilled in the art to which the embodiments pertain having the benefit of the teachings presented in the foregoing descriptions and the associated drawings. These modifications include, but are not limited to, the type or different network services provided or overlays of services, the type or number of fiber optic terminals, the type or number of optical fibers or fiber optic cables carrying optical fibers to and from fiber optic terminals, whether different network services are provided through connectors, connection panels, or optical splitters, and/or whether different network services are provided to subscribers in a centralized or distributed manner.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A fiber optic terminal, comprising:
    a first optical path configurable to provide a first network service by providing one of a first network-side optical fiber and a second network-side optical fiber connected to one of a first subscriber-side optical fiber and a second subscriber-side optical fiber; and
    a second optical path configurable to provide a second network service by providing one of the first network-side optical fiber and the second network-side optical fiber not provided in the first optical path, connected to one of the first subscriber-side optical fiber and the second subscriber-side optical fiber not provided in the first optical path,
    wherein the first optical path is reversibly changeable between the first network-side optical fiber and the second network-side optical fiber, and is reversibly changeable between the first subscriber-side optical fiber and the second subscriber-side optical fiber, and
    wherein the second optical path is reversibly changeable between the first network-side optical fiber and the second network-side optical fiber, and reversible changeable between the first subscriber-side optical fiber and the second subscriber-side optical fiber.

2. The fiber optic terminal of claim 1, wherein the first optical path is reversibly changeable by changing at least one of the connections at the terminal of one of the first network-side optical fiber, the second network-side optical fiber, the first subscriber-side optical fiber, and the second subscriber-side optical fiber.

3. The fiber optic terminal of claim 1, wherein the second optical path is reversibly changeable by changing at least one of the connections at the terminal of the other one of the first network-side optical fiber, the second network-side optical fiber, the first subscriber-side optical fiber and the second subscriber-side optical fiber.

4. The fiber optic terminal of claim 1, wherein the first optical path is not homogeneous with the second optical path.

5. The fiber optic terminal of claim 1, wherein the first optical path includes a first non-split fiber optic connection.

6. The fiber optic terminal of claim 1, wherein the second optical path includes a second non-split fiber optic connection.

7. The fiber optic terminal of claim 1, wherein the first optical path includes a first optical splitter.

8. The fiber optic terminal of claim 7, wherein the second optical path includes a second optical splitter.

9. The fiber optic terminal of claim 1, wherein the first network service is comprised of optical signals at a first wavelength in the first optical path overlaid on optical signals at a second wavelength different from the first wavelength in the first optical path.

10. The fiber optic terminal of claim 1, wherein at least one of the first optical path and the second optical path includes at least one fiber optic connector.

11. The fiber optic terminal of claim 10, further comprising at least one parking area configured to receive the at least one fiber optic connector when the at least one fiber optic connector is not connected to at least one of the first subscriber-side optical fiber and the second subscriber-side optical fiber.

12. The fiber optic terminal of claim 1, wherein the first network service is a service comprised from the group consisting of Asynchronous Transfer Mode (ATM) Passive Optical Network (PON) (APON), Broadband PON (BPON), Ethernet PON (EPON), Gigabit PON (GPON), ten (10) Gigabit EPON (10G-EPON), 10G-GPON, WDM-based network services, and Radio Frequency over Glass (RFoG).

* * * * *